United States Patent [19]

Ishii

[11] Patent Number: 5,339,156
[45] Date of Patent: Aug. 16, 1994

[54] FACSIMILE MAIL SYSTEM LINKED TO DATA COMMUNICATION SYSTEM

[75] Inventor: Toshio Ishii, Kawasaki, Japan

[73] Assignee: Fujitsu Limited, Kawasaki, Japan

[21] Appl. No.: 855,106

[22] Filed: Mar. 18, 1992

[30] Foreign Application Priority Data

Mar. 19, 1991 [JP] Japan .................. 3-053968

[51] Int. Cl.$^5$ ........................................ H04N 1/00
[52] U.S. Cl. .................. 358/402; 358/442; 358/468; 358/400; 379/100
[58] Field of Search ............... 358/402, 400, 407, 403, 358/404, 434, 435, 436, 468, 442, 440; 379/100, 94, 93, 96

[56] References Cited

U.S. PATENT DOCUMENTS

| | | | |
|---|---|---|---|
| 4,941,170 | 7/1990 | Herbst | 379/100 |
| 4,953,199 | 8/1990 | Hoshi et al. | 379/100 |
| 4,994,926 | 2/1991 | Gordon et al. | 358/440 |
| 4,996,704 | 2/1991 | Brunson | 379/94 |
| 4,996,707 | 2/1991 | O'Malley et al. | 379/94 |
| 5,008,926 | 4/1991 | Misholi | 379/94 |

FOREIGN PATENT DOCUMENTS 8707801 12/1987 PCT Int'l Appl. .

OTHER PUBLICATIONS

Computer Networking Symposium Proceedings, Apr., 1988, W. F. Racke et al. "Existing Mail Service to Support X400 Message Handling".
IEEE Journal on Selected Areas in Communications, Feb., 1989, Hayashi et al. "Personal Computer Communications Using Facsimile".

Primary Examiner—Stephen Brinich
Assistant Examiner—Fan Lee

[57] ABSTRACT

A linked mail/message board system wherein a data communication center and a facsimile mail center are linked. The control data of facsimile malls/message boards are held in a data communication center, as well as in the facsimile mail center. The data communication center has a unit for receiving from one of data terminals connected thereto, a command for operating the facsimile mail center, and a unit for transferring the command to the facsimile mail center. The facsimile mail center has a unit for receiving the transferred command, and a unit for executing the command. The data communication center has a unit for receiving from one of the data terminals and transferring to the facsimile mail center, additional information to be attached to a facsimile mail when the facsimile mail is delivered. The data communication center has a unit for transferring an electronic mail to the facsimile mail center, and the facsimile mail center has a unit for converting the additional information and the information in the electronic mail into image data to transmit the image data by facsimile.

42 Claims, 29 Drawing Sheets

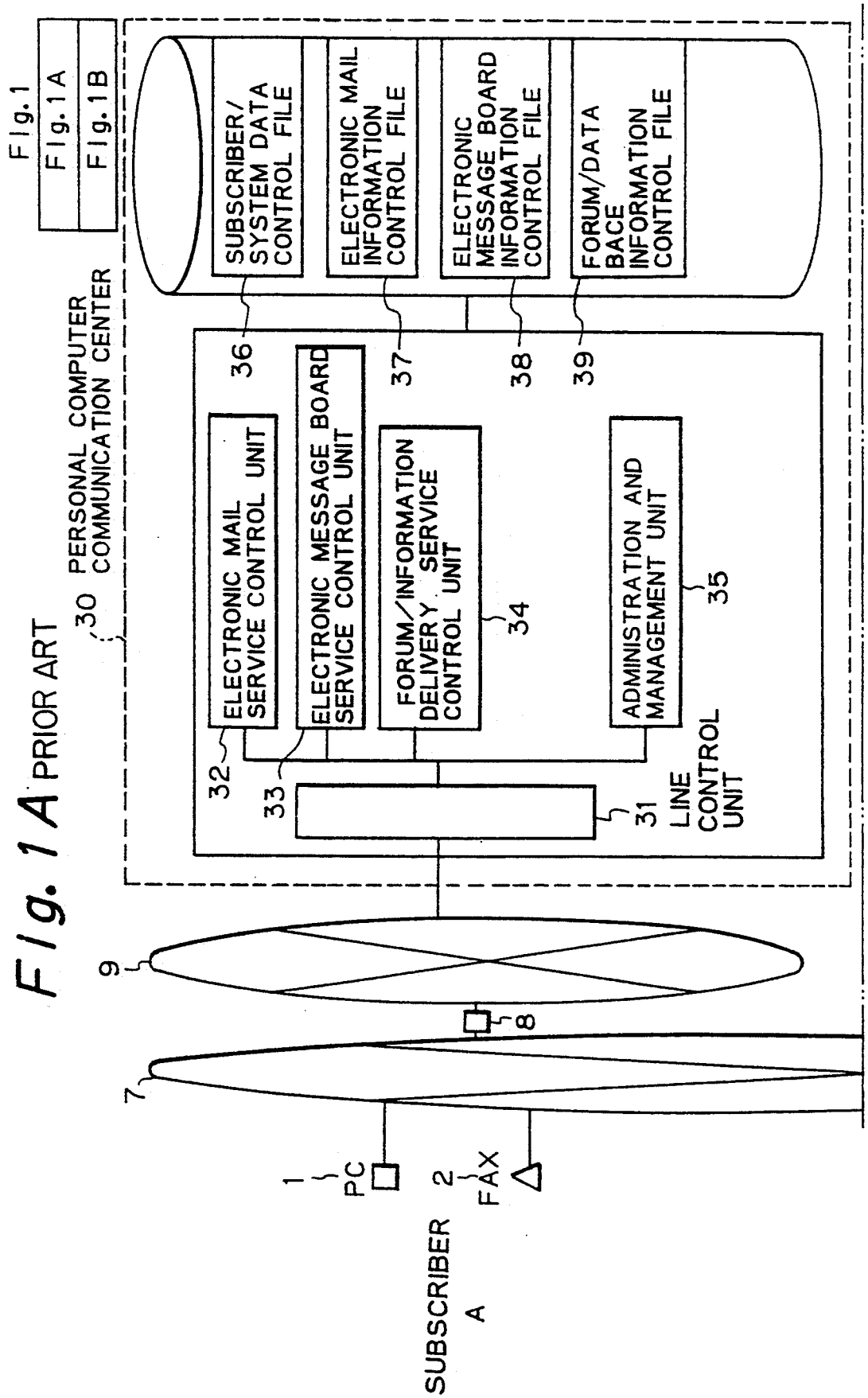

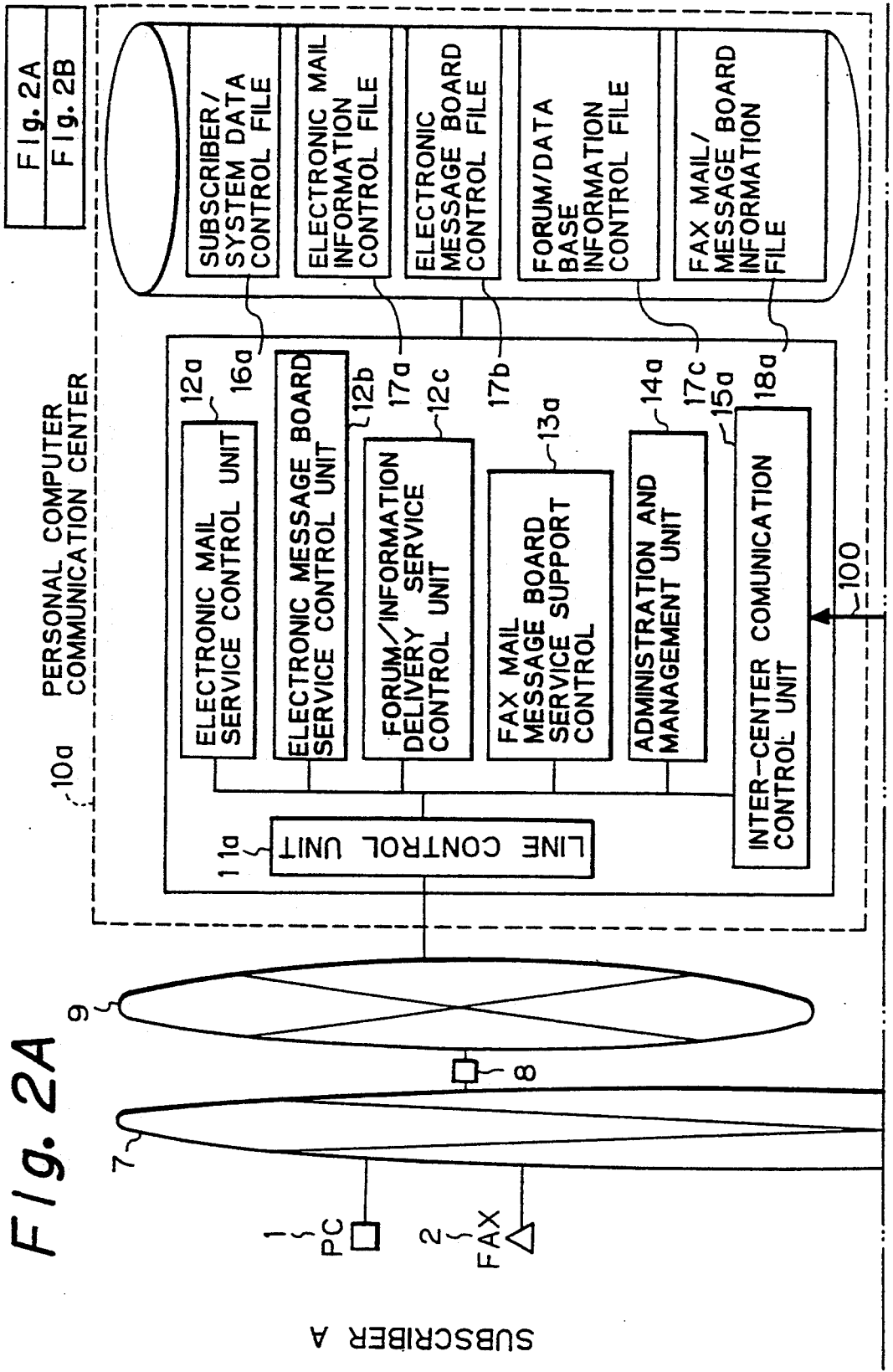

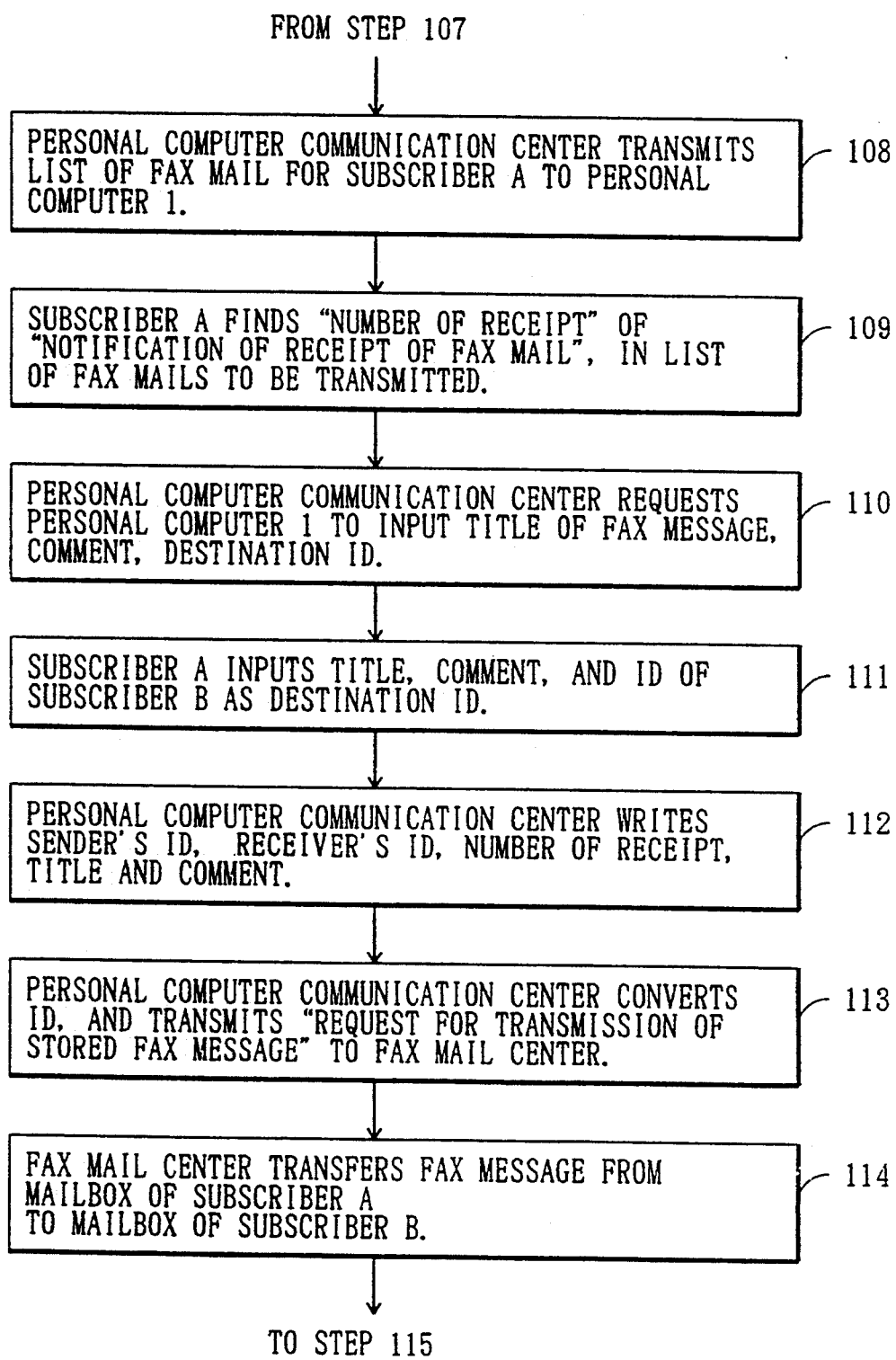

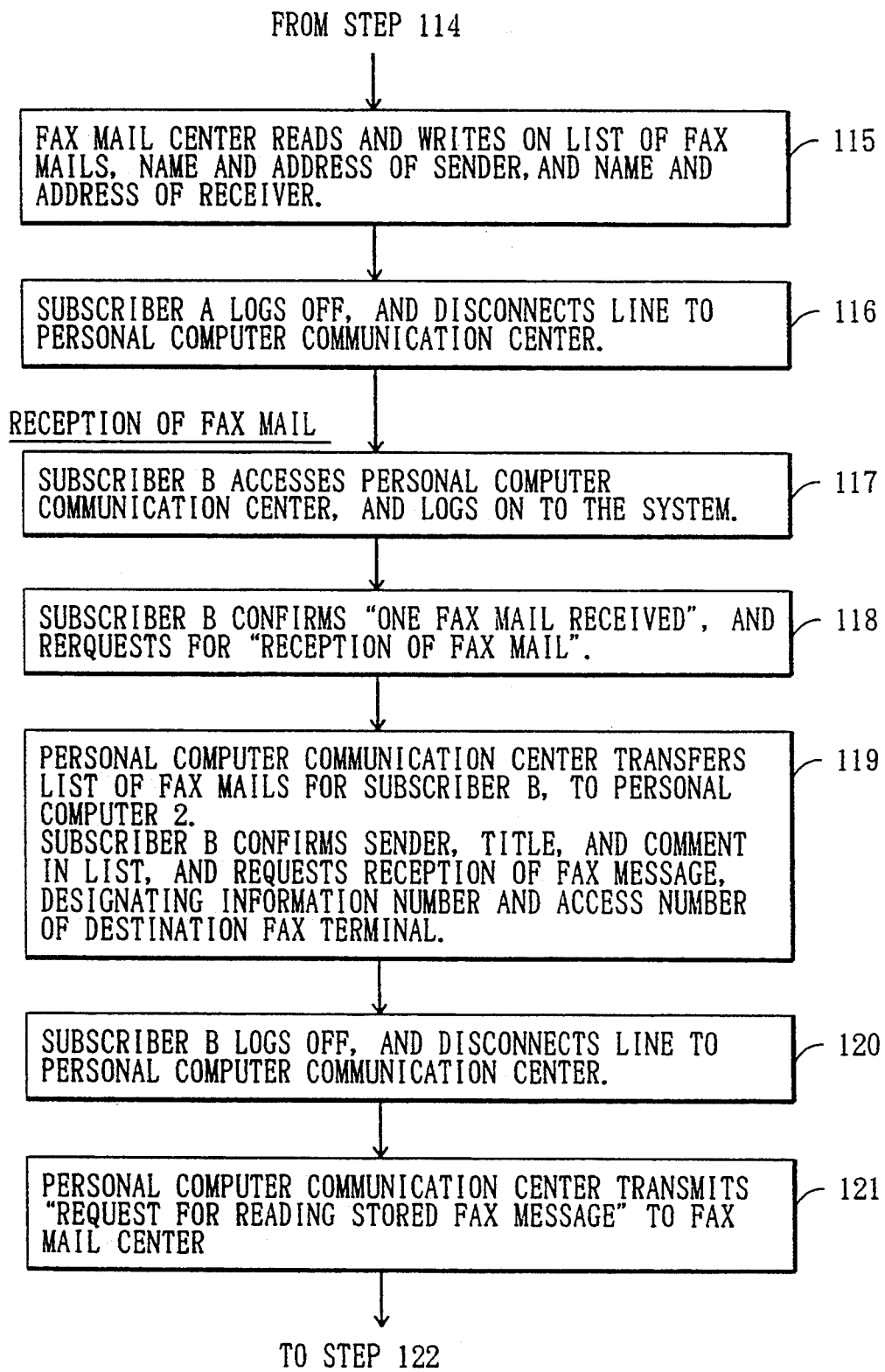

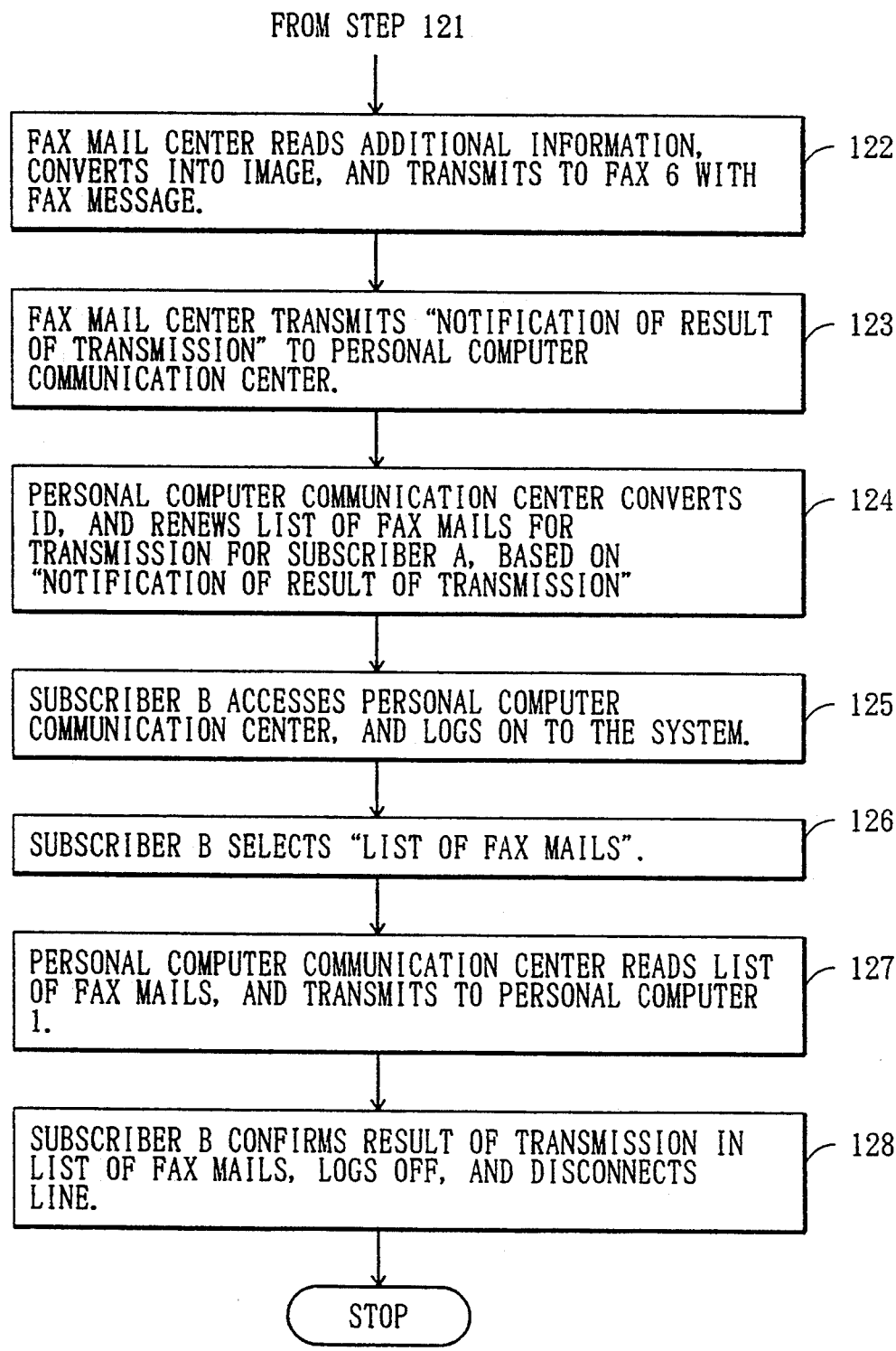

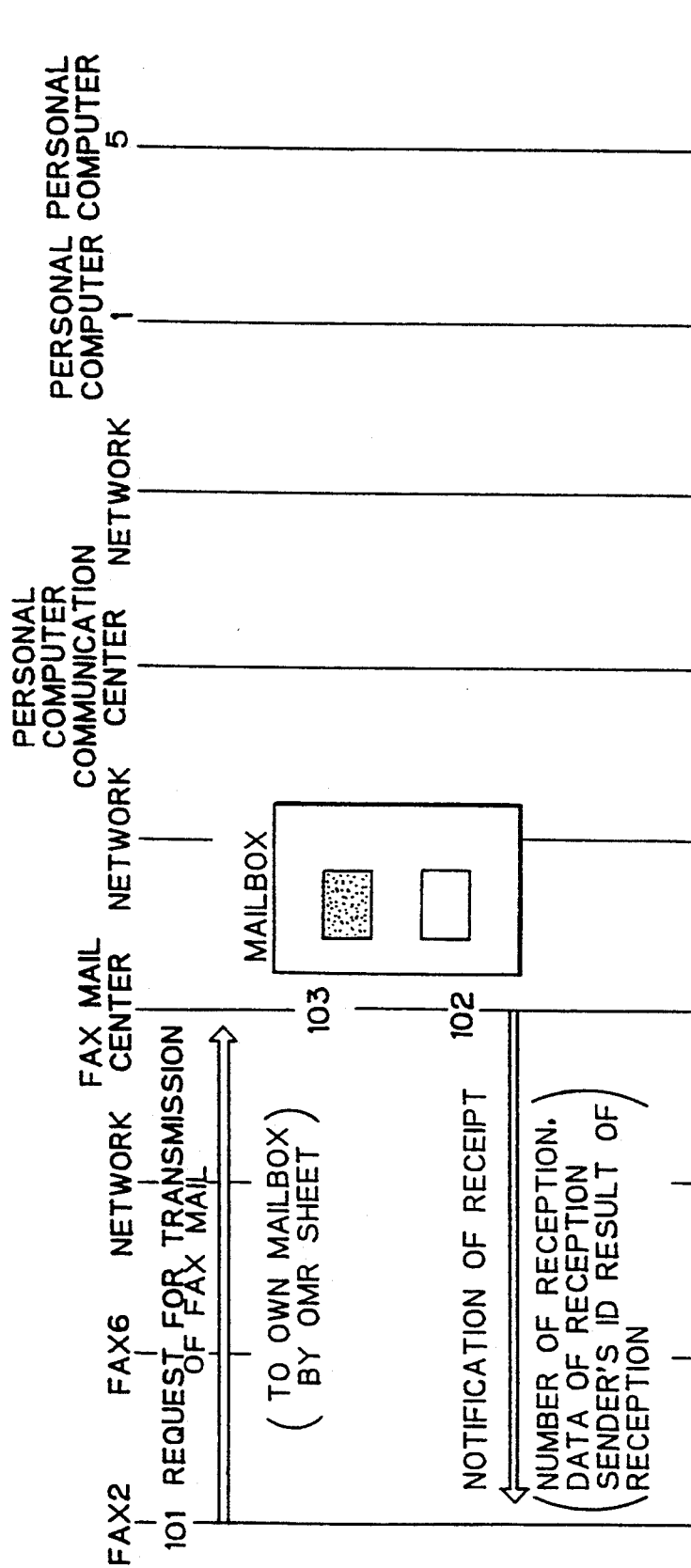

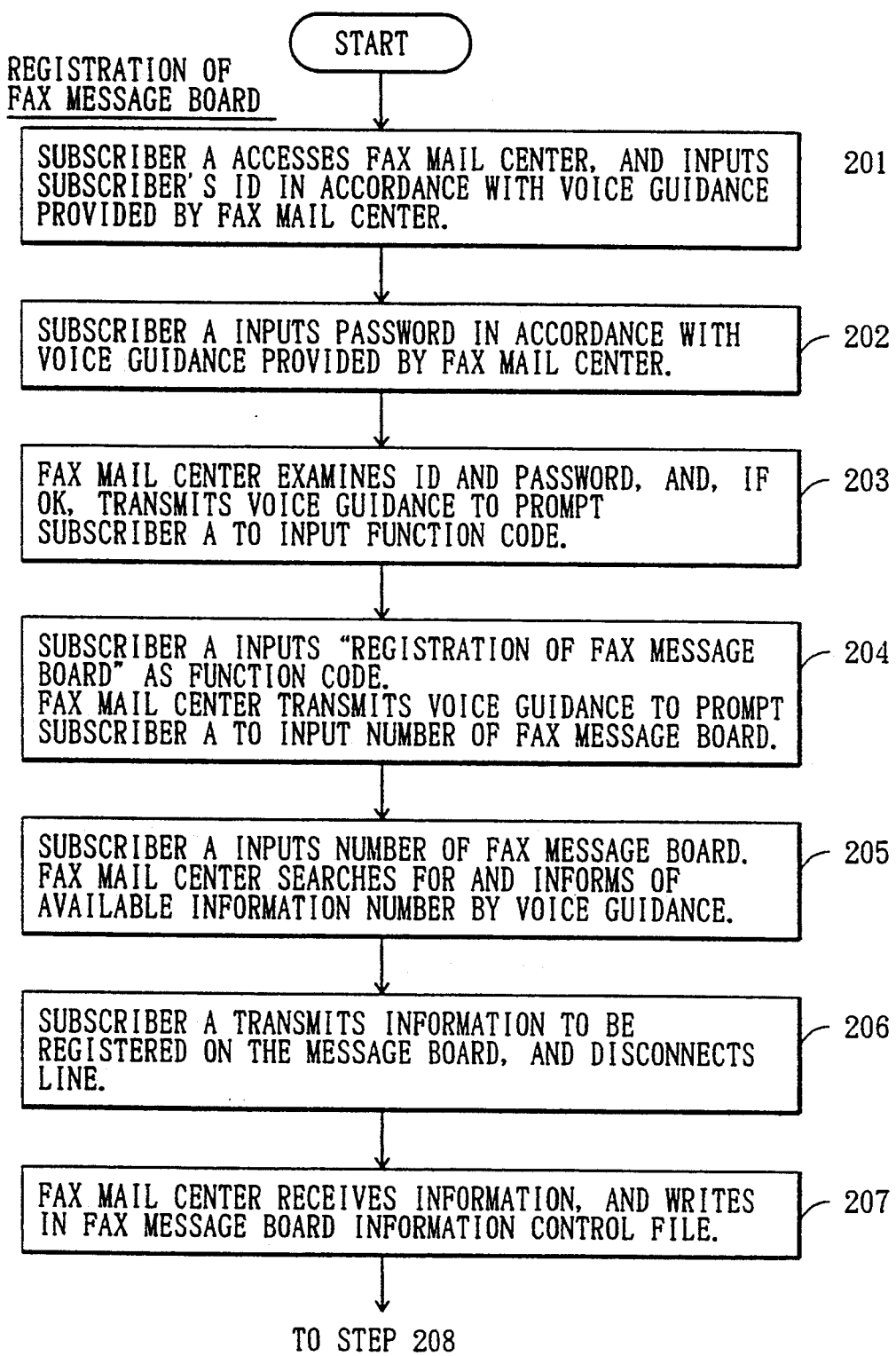

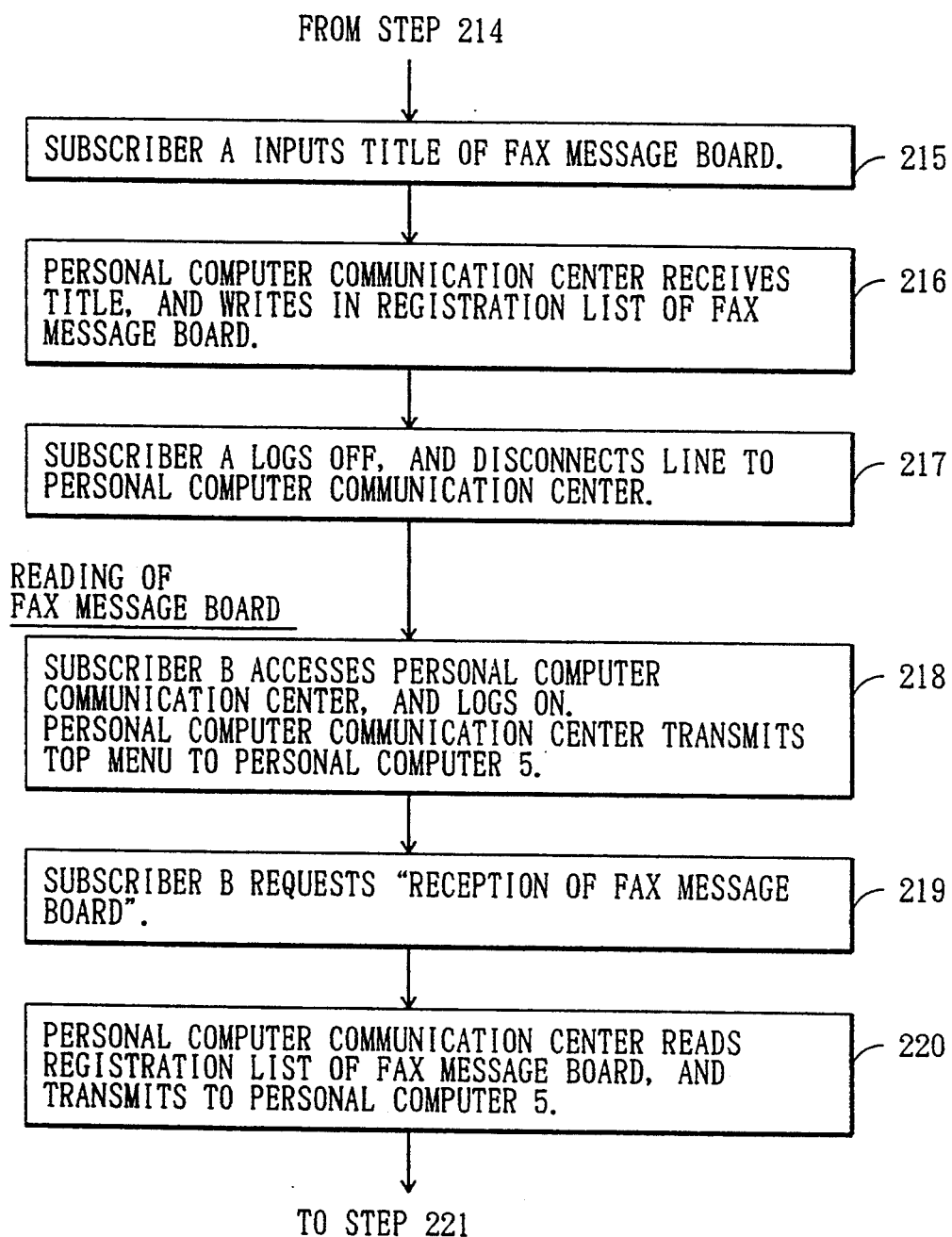

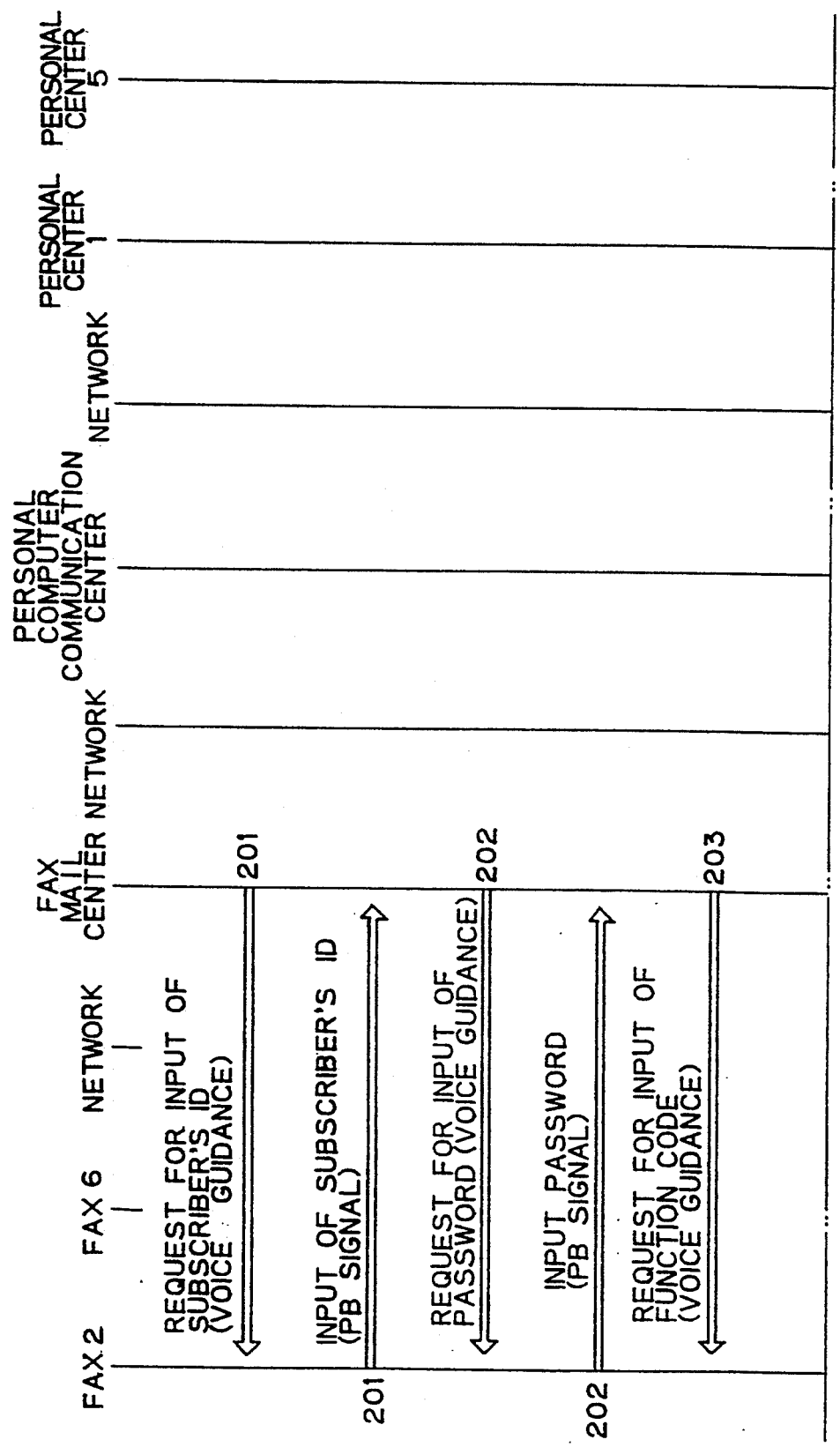

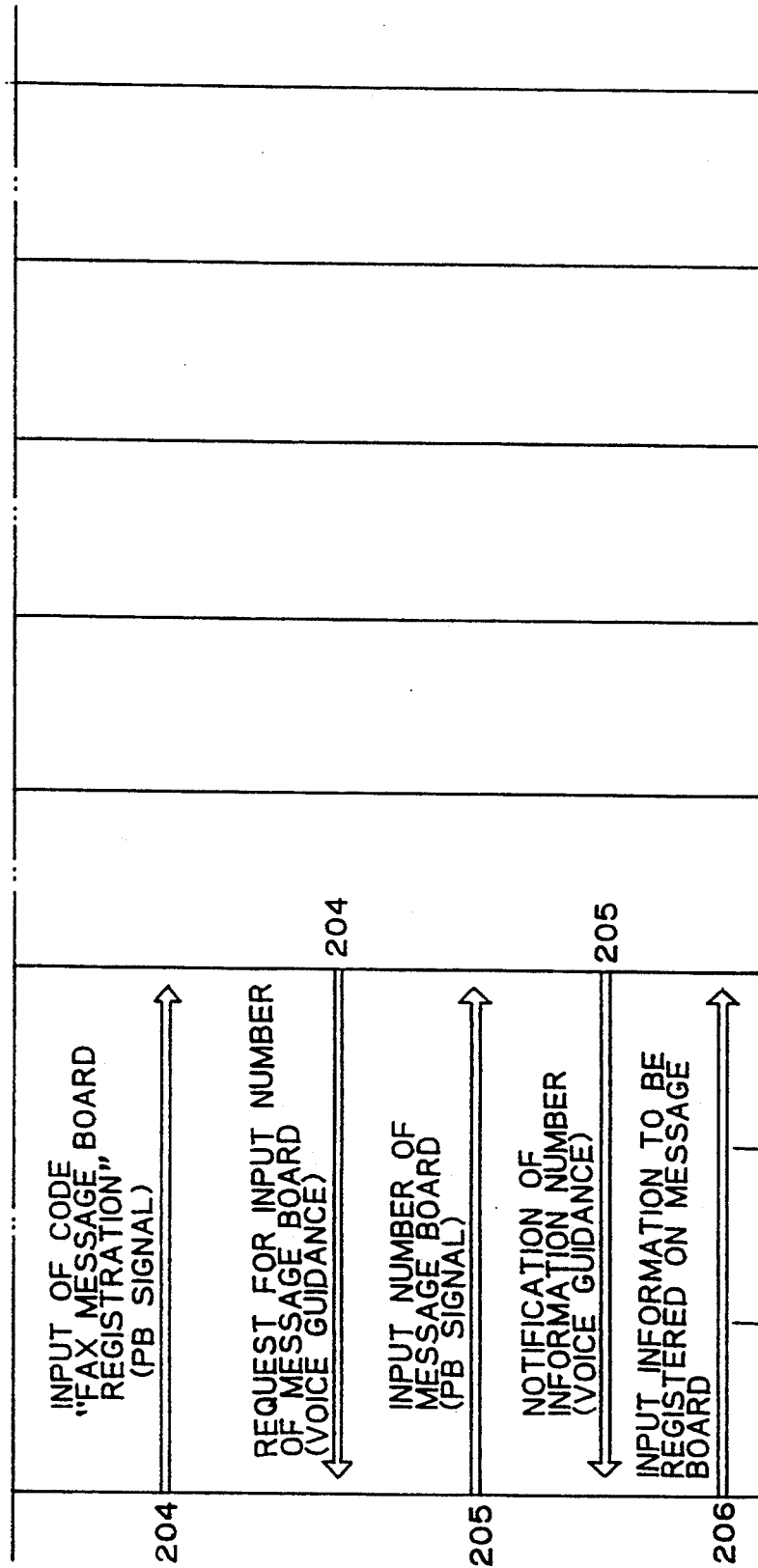

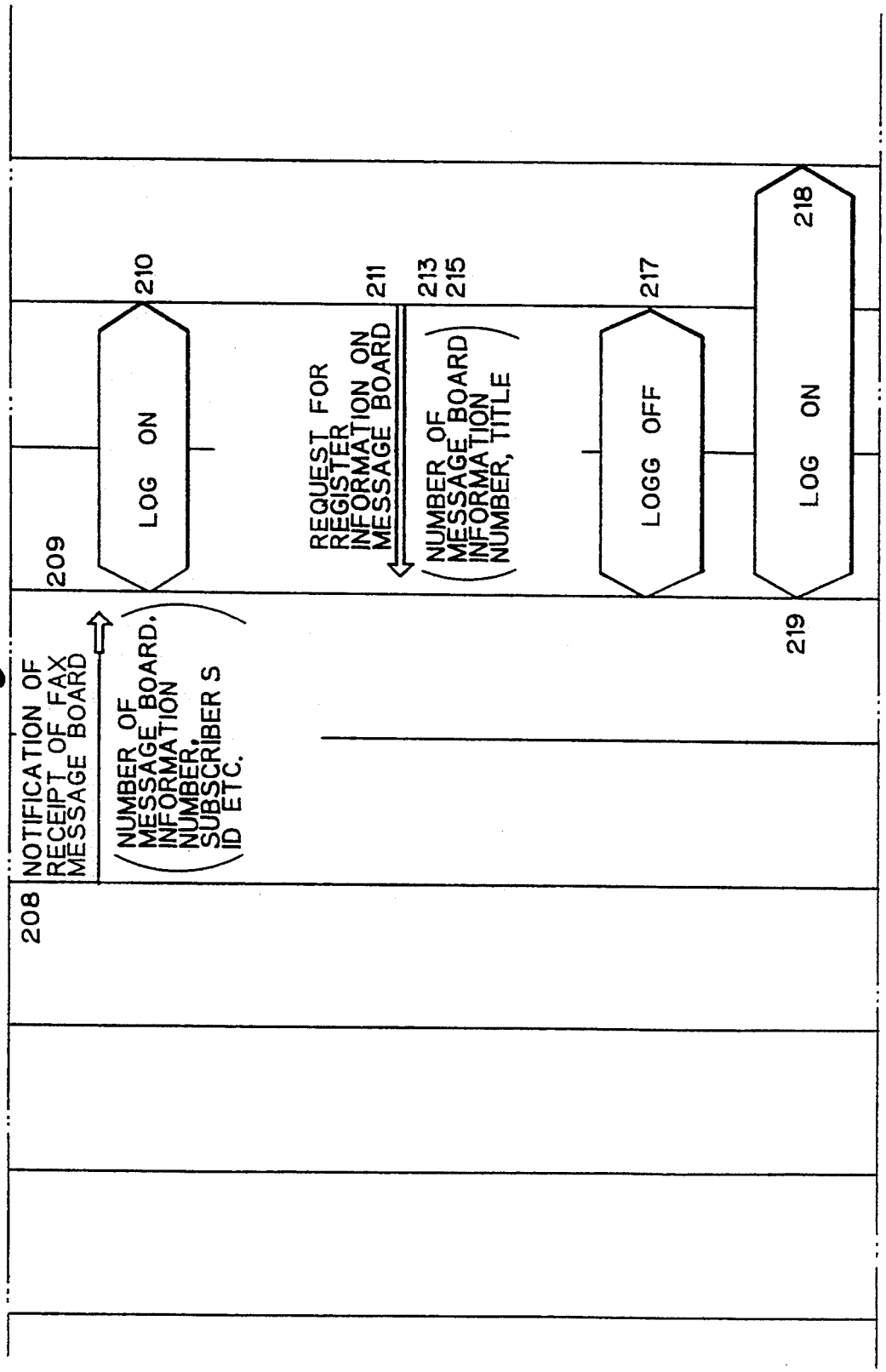

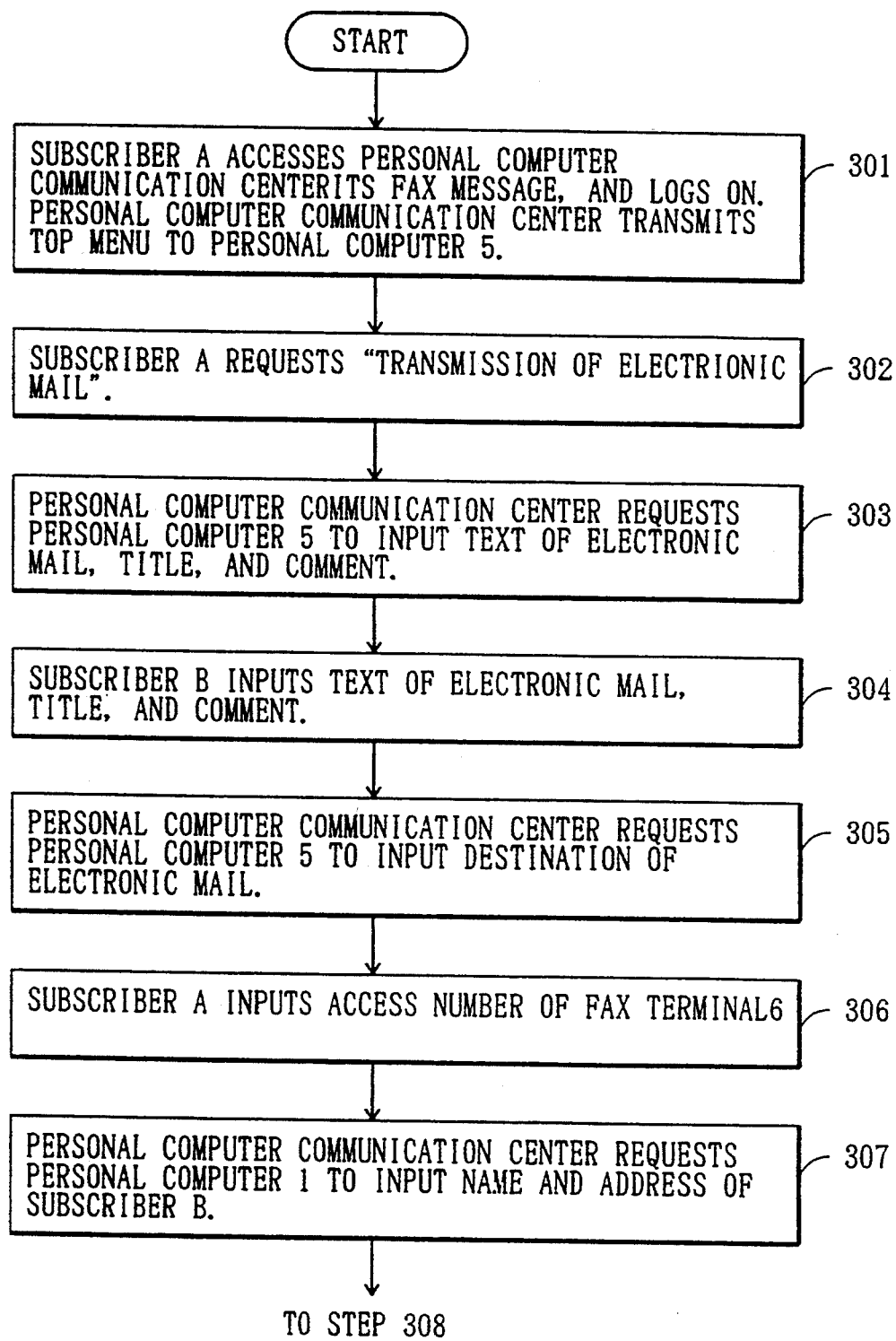

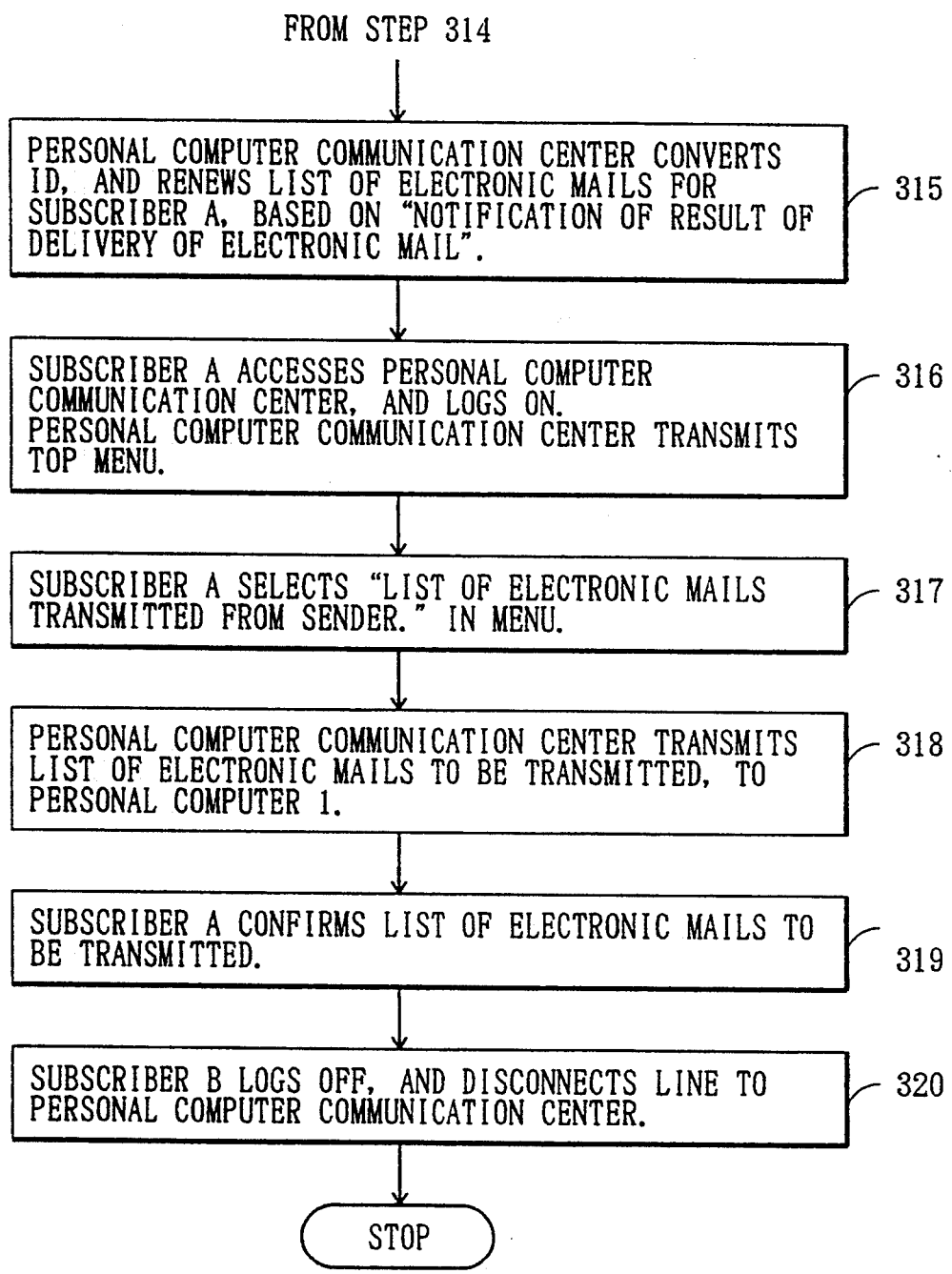

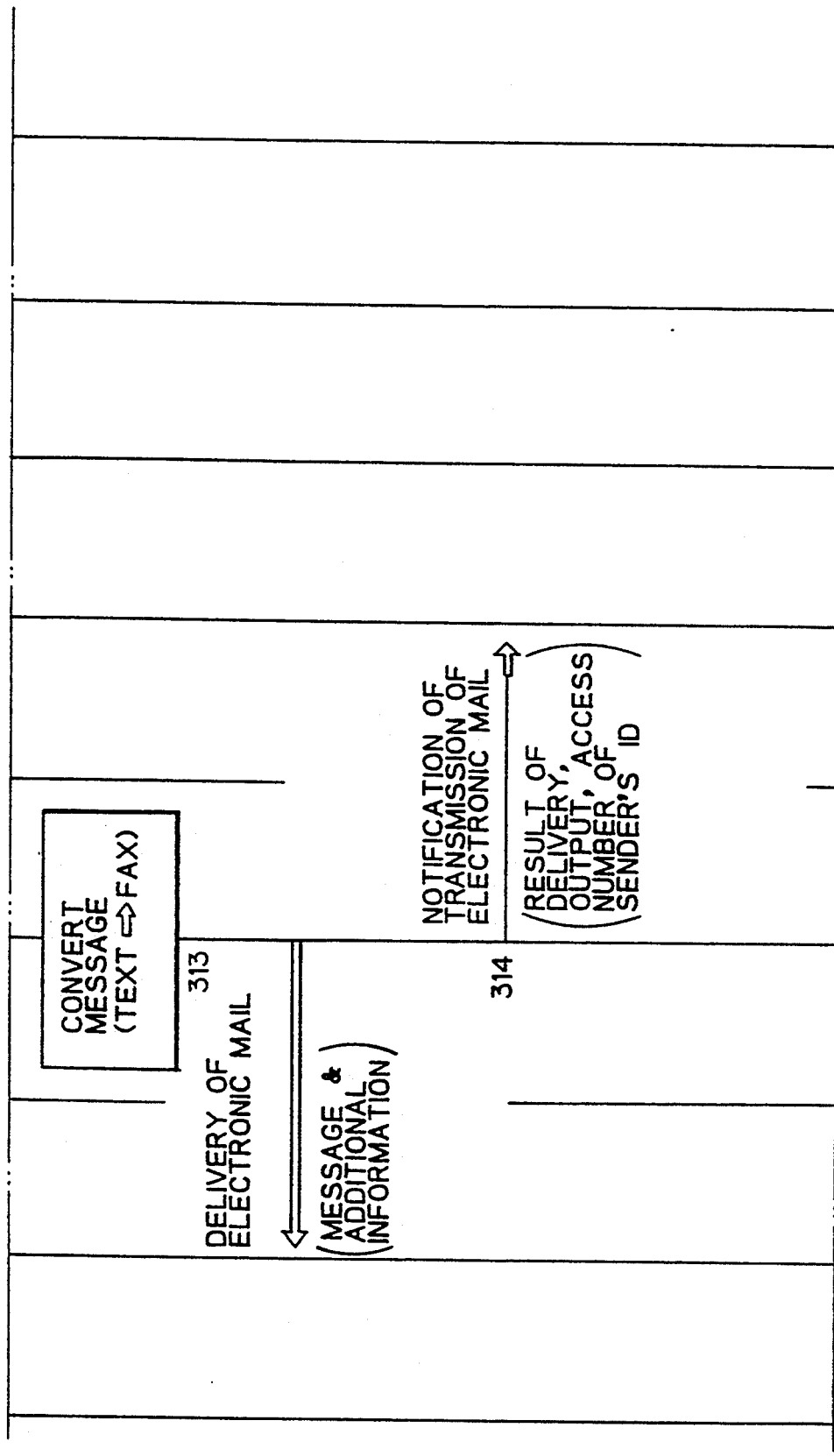

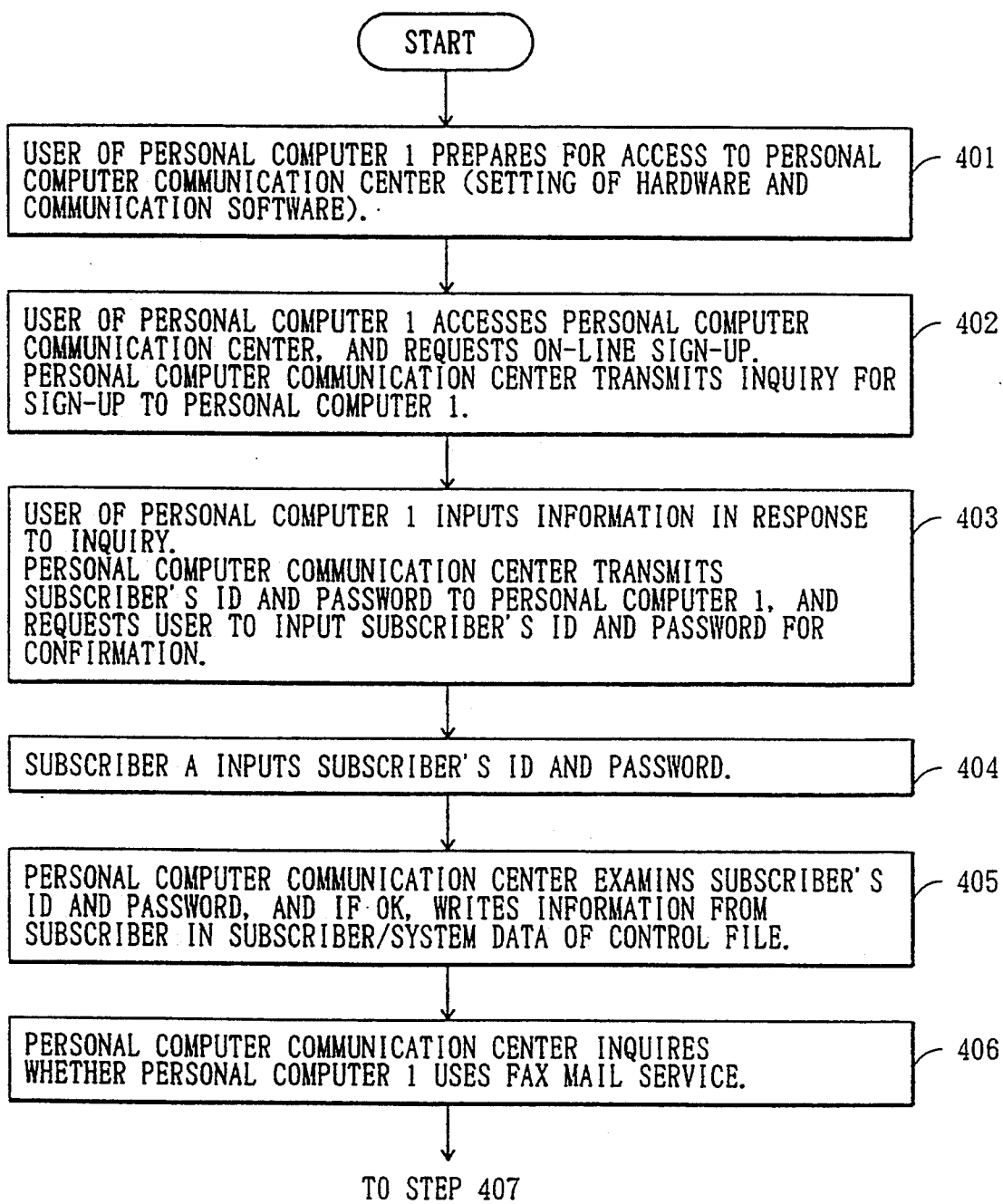

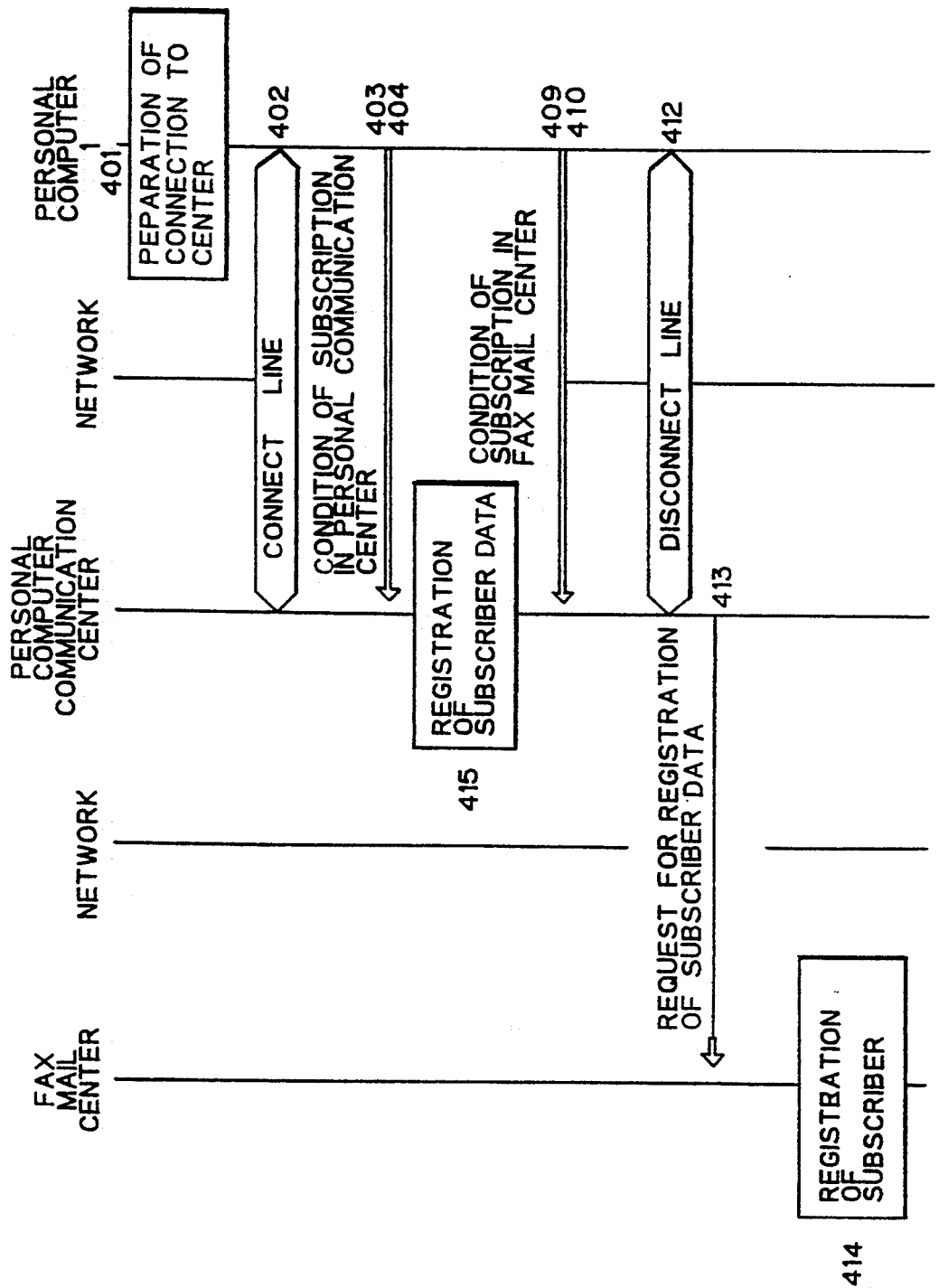

FACSIMILE MAIL SYSTEM LINKED TO DATA COMMUNICATION SYSTEM

BACKGROUND OF THE INVENTION (1) Field of the Invention

The present invention relates to a facsimile mail system and an electronic mail system.

The facsimile communication is widely used in the field of business. In addition, recently, personal computer communication systems are also used in the business field. The electronic mail system is provided as one of various services of the personal computer communication system.

(2) Description of the Related Art

The conventional facsimile mail systems have the following problems.

(a) Operations of command inputs for transmission and reception of information, registration or deletion a message in a message board, and input of other information such as an address number, from the subscriber, are carried out manually by using push buttons of a facsimile terminal. Therefore, an error is likely to occur in the input operation by the subscriber.

(b) Since the above input operation of each command or information is carried out in response to an instruction, the operation is very bothersome, and such a bothersome operation may cause an error.

(c) The sender-Bide user cannot be informed of whether or not information has been received in the receiver-side user because the facsimile terminal returns no signal indicating completion of the reception to a facsimile mail center.

(d) When a subscriber receives a message in a mailbox for the subscriber in the facsimile mail center, or a message on the facsimile message board in the facsimile mail center, the subscriber cannot know what information is included in the message before the reception of the message is completed.

(e) The facsimile mail cannot be received anytime the receiver-side subscriber wishes to receive it.

The conventional electronic mail systems have the following problems.

(f) Conventionally, a facsimile delivery service is provided in electronic mail systems whereby a message transmitted from a sender-side subscriber as an electronic mail can be delivered to a receiver-side subscriber as facsimile information. However, a format of facsimile information delivered by the facsimile delivery service is deformed since information on tile sender-side subscriber, a date, a title, or the like, is inserted on the top of a sheet on which the received facsimile information is printed, and accordingly the beginning of the message is shifted lower in the sheet. This may make the use of the sheet in a formal situation difficult.

(g) Although additional information such as a comment from the sender-side subscriber to the receiver-side subscriber, an address of the sender-side subscriber, or the like, can be indicated on a cover sheet of facsimile information, this is impossible in the electronic mail system.

SUMMARY OF THE INVENTION

An object of the present invention is to provide a system wherein an electronic mail system and a facsimile mail system are linked, so that the linked system has the advantages of both the electronic mail system and the facsimile mail system.

According to a first aspect of the present invention, there is provided a linked mail system, comprising a data communication system and a facsimile mail system. The data communication system includes a plurality of data terminals, and a data communication center connected to the above plurality of data terminals, respectively, through a communication network, for managing and controlling transmissions of text and binary information, including electronic mails, among the plurality of data terminals and the data communication center. The facsimile mail system comprises a plurality of facsimile terminals and a facsimile mail center connected to the above plurality of facsimile terminals, respectively, through a communication network, for managing and controlling transmissions of facsimile mails among the plurality of facsimile terminals and the above facsimile mail center. The data communication center and the facsimile mail center are connected to each other by a signal path. The above facsimile mail center comprise a facsimile mail service control unit for controlling the transmission of facsimile mails; a first communication control unit for controlling communication operations between the above facsimile mail service control unit and the plurality of data terminals, on the side of the facsimile mail center; a second communication control unit for controlling communication operations between the facsimile mail service control unit and the data communication center through the signal path, on the side of the above facsimile mail center; a facsimile mail information storage unit for storing contents of facsimile mails which are to be transmitted to one or more of the plurality of facsimile terminals; and a facsimile mail control data storing unit for storing control data being used for controlling the transmission of facsimile mails. The data communication center comprises an electronic mail service control unit for controlling the transmission of electronic mails; a third communication control unit for controlling communication operations between the electronic mail service control unit and the plurality of data terminals, on the side of the data communication center; a fourth communication control unit for controlling communication operations between the electronic mail service control unit and the facsimile mail center through the signal path, on the side of the data communication centers; a electronic mail information storage unit for storing contents of electronic mails which are to be transmitted to one or more of the plurality of facsimile terminals; and an electronic mail control data storing unit for storing control data being used for controlling the transmission of electronic mails.

In the above linked mail system according to the first aspect of the present invention, the data communication center may further comprises facsimile operating command receiving unit for receiving a command for an operation of the facsimile mail center, through the third communication control unit; and a facsimile operation command relay unit for transferring the command to the facsimile mail center by the fourth communication control unit and the signal path through the signal path. The facsimile mail center may comprise relayed command executing unit for receiving the command transferred through the signal path and the second communication control unit, and executing the received command by activating the facsimile mail service control unit in response to the received command.

In the linked mail system as described, the facsimile operating command receiving unit may receive a command for transmitting a message stored in the facsimile mail information storage unit, to one or more of the plurality of facsimile terminals.

In the linked mail system as described above, the facsimile mail information storage unit may comprise a mailbox corresponding to each of the plurality of facsimile terminals, and the mailbox stores a message transmitted from the corresponding facsimile terminal to the facsimile mail center, and a message to be transmitted from the facsimile mail center to the corresponding facsimile terminal. The facsimile operating command receiving unit may receive a command for transferring a message stored in the mailbox corresponding to one of the plurality of facsimile terminals, to one or more of the other mailboxes corresponding to the plurality of facsimile terminals other than one facsimile terminal, and the facsimile mail service control unit in the facsimile mail center may comprise a unit for transferring the message stored in the mailbox corresponding to the one of the plurality of facsimile terminals, to the one or more of the other mailboxes corresponding to the plurality of facsimile terminals other than the one facsimile terminal, in response to the above command for the transferring operation.

In the above described linked mail system as described, the facsimile operating command receiving unit may receive a command for transmitting a message stored in one of the mailbox to one corresponding to the mailbox, of the plurality of facsimile terminals, and the facsimile mail service control unit in the facsimile mail center may comprise a unit for transmitting the message stored in the one of the mailbox to the above one, corresponding to the mailbox, of the plurality of facsimile terminals, in response to the command for the transmitting operation.

In the above described linked mail system as described, the data communication center may comprise a first list storing unit for storing a first list of messages stored in each mailbox and transmitted thereto from the corresponding facsimile terminal; and a second list storing unit for storing a second list of messages stored in each mailbox and transferred thereto from one of the other mailboxes to be transmitted to one of the plurality of facsimile terminals corresponding to the mailbox. The first list contains information on whether or not each of the messages of the first list have been transferred to one or more of the plurality of facsimile terminals to which each message is to be transmitted, and the second list contains information on whether or not each of the messages of the second list have been transmitted to the one of the plurality of facsimile terminals to which each message is to be transmitted. The data communication center may further comprise: a unit for receiving a request for transmitting information in the first and second lists to one of the plurality of data terminals through the third communication control unit, from the one of the plurality of data terminals; and a unit for transmitting the information in the first and second lists to the one of the plurality of data terminals from which the command for requesting transmitting information is received, through the third communication control unit, in response to the request.

In the linked mail system as described in, the data communication center may comprise a second facsimile mail control data storing unit for storing at least a part of the control data stored in the facsimile mail control data storing unit in the facsimile mail center, including the contents of the first and second lists, and the facsimile mail service control unit in the facsimile mail center may comprise a facsimile control data transmitting unit for transmitting the at least a part of the control data stored in the facsimile mail control data storing unit, including the contents of the first and second lists, to the data communication center by the second communication control unit through the signal path, when the control data is renewed.

In the linked mail system as described above, the data communication center may further comprise an additional information receiving unit for receiving additional information to be attached to a message stored in one of the mailbox; and an additional information transmitting unit for transmitting the additional information to the facsimile mail center by the fourth communication control unit. The facsimile operating command receiving unit receives a command for attaching the additional information to the above message, and transmitting the message together with the additional information, to one of the plurality of facsimile terminals corresponding to the mailbox storing the message. The facsimile mail service control unit in the facsimile mail center may comprise a unit for receiving the command of the attaching and transmitting, through the second communication control unit; a unit for receiving the additional information transmitted from the additional information transmitting unit, through the second communication control unit; a converting unit for converting the received additional information into image data; and a transmitting unit for transmitting by facsimile the image data of the converted additional information and the message, to one of the plurality of facsimile terminals corresponding to a mailbox storing the message, through the first communication control unit in response to the command of the attaching and transmitting operations.

In the linked mail system according to the first aspect of the present invention, the above data communication center may further comprise a facsimile delivery command receiving unit for receiving through the third communication control unit, a command for delivering by the facsimile mail center, a message of an electronic mail stored in the electronic mail information storing unit, to one or more of the plurality of facsimile terminals; and a facsimile delivery supporting unit for transferring the command and the information in the electronic mail to the above facsimile mail center by the fourth communication control unit through the signal path. The facsimile mail center may further comprise a converting unit for receiving the command and the information in the electronic mail transferred from the data communication center through the second communication control unit, and converting the information in the electronic mail into image data; a facsimile delivery unit for delivering by facsimile the image data of the converted information in the electronic mail, to the one or more of the plurality of facsimile terminals, through the first communication control unit.

In the linked mail system according to the first aspect of the present invention, the data communication center may comprise a unit for assigning a first identification number to each of the plurality of data terminals, and the facsimile mail center may comprise a unit for assigning a second identification number to each of the plurality of facsimile terminals. The data communication center may further comprise a unit for converting one of the second identification number into a corresponding first identification number, and the facsimile mail center may further comprise a unit for converting one of the first identification number into a corresponding second identification number.

In the linked mail system according to the first aspect of the present invention, the data communication center may comprise a unit for receiving a request for a subscriber signing-up of the linked mail system, from one of the plurality of data terminals; a first inquiry unit for transmitting a first inquiry on a first condition as a subscriber of the data communication system, to the data terminal from which the above request is received, through the third communication control unit; a unit for receiving information on the first condition from the data terminal through the third communication control unit in response to the first inquiry; a first registration unit for registering the first condition corresponding to the data terminal; a second inquiry unit for transmitting inquiries on a second condition as a subscriber of the facsimile mail system to the data terminal from which the request is received, through the third communication control unit (the second condition includes information by which the facsimile mail center can access one of the above plurality of facsimile terminals corresponding to the data terminal); a unit for receiving information on the second condition from the above data terminal through the third communication control unit in response to the above second inquiry; a second registration unit for registering the second condition corresponding to the data terminal; and a subscriber's condition transferring unit for transferring the second condition to the above facsimile mail center by the fourth communication control unit through the signal path. The above facsimile mail center may comprise a unit for receiving the second condition through the second communication control unit; and a second registration unit for registering the second condition corresponding to the data terminal.

According to a second aspect of the present invention, there is provided a linked message board system comprising a data communication system and a facsimile mail/message board system. The data communication system includes a plurality of data terminals, and a data communication center connected to the plurality of data terminals, respectively, through a communication network, for managing and controlling transmissions of text and binary information, including electronic message boards, among the plurality of data terminals and the data communication center. The facsimile mail/message board system includes a plurality of facsimile terminals, and a facsimile mail/message board center connected to the plurality of facsimile terminals, respectively, through a communication network, for managing and controlling registration and reading operations of facsimile message boards by the plurality of facsimile terminals. A signal path connects the data communication center with the facsimile message board center. The facsimile mail/message board center comprises a facsimile message board service control unit for controlling the transmission of information on the facsimile message boards by the plurality of data terminals; a first communication control unit for controlling, on the side of the facsimile mail/message board center, the transmission of information on the facsimile message boards between the plurality of data terminals and the facsimile mail/message board center; a second communication control unit for controlling, on the side of the facsimile mail/message board center, communication operations between the facsimile message board service control unit and the facsimile mail/message board center through the signal path; a facsimile message board information storage unit for storing the contents of the facsimile message boards; and a facsimile message board control data storing unit for storing control data being used by the service control unit for controlling the facsimile message boards. The data communication center comprises a service control unit for controlling the transmission of electronic message boards; a third communication control unit for controlling communication operations between the service control unit and the plurality of data terminals, on the side of the data communication center; and a fourth communication control unit for controlling communication operations between the service control unit and the facsimile mail/message board center through the signal path, on the side of the data communication center.

In the above linked message board system according to the second aspect of the present invention, the data communication center may further comprise a facsimile operating command receiving unit for receiving a command for the facsimile mail/message board center through the third communication control unit; and a facsimile operation command relay unit for transferring the command to the facsimile mail/message board center by the fourth communication control unit through the signal path. The facsimile mail/message board center may comprise a relayed command executing unit for receiving the command transferred through the signal path and the second communication control unit, and executing the received command by activating the facsimile message board service control unit in response to the received command.

In the above described linked message board system, the facsimile operating command receiving unit may receive a command for transmitting a message stored in the facsimile message board information storage unit, to one or more of the plurality of facsimile terminals.

In the linked message board system, the facsimile message board information storage unit may store information on the message boards. The facsimile operating command receiving unit receives a command for transmitting a message stored in one of the message boards to one of the plurality of facsimile terminals, and the facsimile message board service control unit in the facsimile mail/message board center may comprise a unit for transmitting the message stored in the one of the plurality of facsimile terminals, in response to the command for the transmitting operation.

In the linked message board system, the data communication center may comprise a list storing unit for storing a list of messages stored in each message board. The data communication center further comprises a unit for receiving a request for transmitting information in the list to one of the plurality of data terminals through the third communication control unit, from the one of the plurality of data terminals; and a unit for transmitting the information in the list to the one of the plurality of data terminals from which the command for requesting transmitting information is received, through the third communication control unit, in response to the request.

In the linked message board system, the data communication center may comprise a second facsimile message board control data storing unit for storing at least a part of the control data stored in the facsimile message board control data storing unit in the facsimile mail/message board center, including the contents of the said list. The facsimile message board service control unit in the facsimile mail/message board center may comprise a facsimile control data transmitting unit for transmitting the at least a part of the control data stored in the facsimile message board control data storing unit, including the contents of the list, to the data communication center by the second communication control unit through the signal path, when the control data is renewed.

BRIEF DESCRIPTION OF THE DRAWINGS

In the drawings:

FIGS. 1A and 1B are a block diagram of a conventional electronic mail system and a conventional facsimile mail system respectively;

FIGS. 2A and 2B show a diagram of a mail system according to an embodiment of the present invention;

FIGS. 3A to 3D show a flowchart of the transmission and reception of a facsimile mail;

FIGS. 4A to 4D show a sequence diagram of transmission and reception operations of a facsimile mail;

FIGS. 5A to 5D show a flowchart of registration and reading operations of a facsimile message board;

FIGS. 6A to 6D show a sequence diagram of registration and reading operations of a facsimile message board;

FIGS. 7A to 7C show a flowchart of facsimile delivery operations of an electronic mail;

FIGS. 8A to 8C show a sequence diagram of facsimile delivery operations of an electronic mail;

FIGS. 9A and 9B show a flowchart of registration of subscriber data; and

FIG. 10 is a sequence diagram of registration operations of subscriber data.

DESCRIPTION OF THE PREFERRED EMBODIMENTS

Figure 1B:
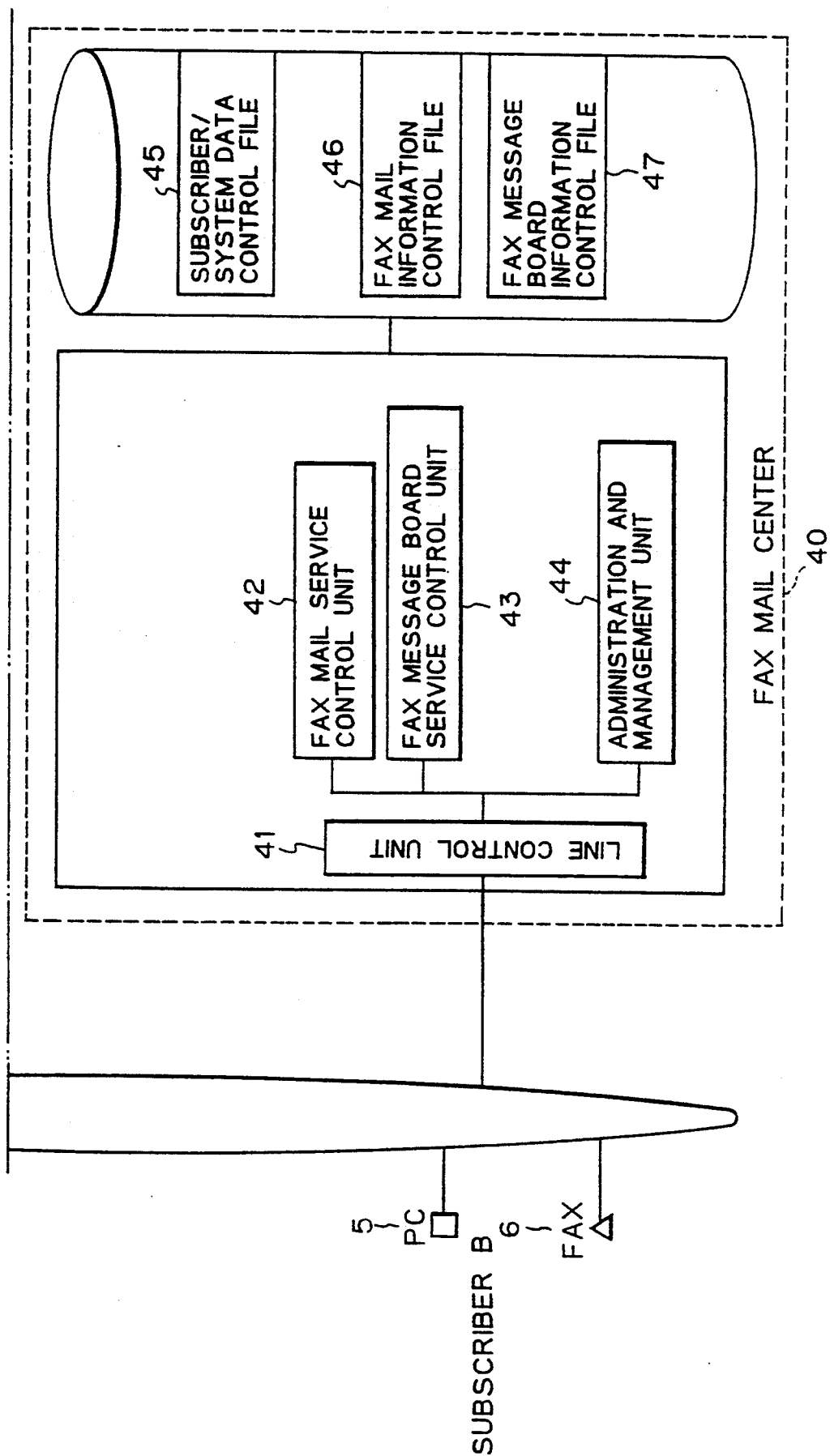

Conventional System (FIGS. 1A and 1B)

FIGS. 1A and 1B show a block diagram of a conventional electronic mail system and a conventional facsimile mail 10 system. In FIGS. 1A and 1B, reference numeral I denotes a personal computer at a subscriber A, 2 denotes a facsimile terminal at a subscriber A, 5 denotes a personal computer at a subscriber B, 6 denotes a facsimile terminal at a subscriber B, 7 denotes a public telephone network, 8 denotes an access point to personal computer communication center 30, 9 denotes a public or private packet communication network, 30 denotes a personal computer communication center, 31 denotes a line control unit, 32 denotes an electronic mail service control unit, 33 denotes an electronic message board service control unit, 34 denotes a forum information delivery service control unit, 35 denotes an administration and management unit, 36 denotes subscriber/system data control file, 37 denotes an electronic mail information control file, 38 denotes an electronic message board information control file, 39 denotes a forum/data base information control file, 40 denotes a facsimile mail center, 41 denotes a line control unit, 42 denotes a facsimile mail service control unit, 43 denotes a facsimile message board service control unit, 44 denotes an administration and management unit, 45 denotes a subscriber/system data control file, 46 denotes a facsimile mail information control file, and 47 denotes a facsimile message board information control file.

As indicated in FIGS. 1A and 1B, conventionally, the electronic mail system and the facsimile mail system are independent of each other, and no linkage is provided between the two systems. Conventionally, transmission and reception of a facsimile mail is carried out as follows.

The subscriber A dials a telephone-access number of the facsimile mail center 40 from the facsimile terminal 2 at the subscriber A to request the exchange in the public telephone network 7 to connect a line between the facsimile mail center 40 and the fascsimile terminal 2 through the public telephone network 7. The exchange calls the facsimile mail center 40. The line control unit 41 in the facsimile mail center 40 responds to the call from the exchange to connect the facsimile mail center 40 with the facsimile terminal 2 through the public telephone network 7. The subscriber A inputs an identification number (ID) of the subscriber A and a password by pushing the push buttons in accordance with a log-on procedure provided from the line control unit 41. The line control unit 41 examines the ID and the password. When the line control unit 41 determines that the ID and the password are acceptable, the line control unit 41 returns a voice guidance message to prompt the subscriber A to input a function code, to the facsimile terminal 2. When the subscriber A transmits a function code corresponding to the transmission of a facsimile mail by pushing the push buttons, the line control unit 41 recognizes the function code and activates an operation of the facsimile mail service control unit 42. Then, the facsimile mail service control unit 42 outputs a voice guidance message to prompt the subscriber A to input a destination address number, to the subscriber A. The subscriber A inputs an identification number of the subscriber B by pushing tile push buttons, and then transmits a facsimile message to the facsimile mail center 40. The facsimile mail service control unit 42 returns an acknowledgment of the reception, to the facsimile terminal 2, renews a transmission record of the subscriber A and a reception of the subscriber B, and transmits the message to the facsimile terminal 6 at the subscriber B. The facsimile mail service control unit 42 refers to the subscriber/system data control file 45 for a way to inform the sender-side subscriber A (telephone or facsimile terminal) of the transmission result, and informs the subscriber A of the transmission result. As described above, input operations of the function code, the identification number, the password, or the like, are carried out by using push buttons of facsimile terminal. Otherwise, an OMR (optical mark sheet reader) sheet (mark sheet) may be used for inputting the above information from the sender-side subscriber.

Conventionally, transmission and reception of an electronic mail is carried out as follows.

The subscriber A dials a telephone-access number of the access point 8 to the personal computer communication center 30, from the personal computer 1 at the subscriber A to request the exchange in the public telephone network 7 to connect a line between the access point 8 and the personal computer 1 through the public telephone network 7. The exchange calls the access point 8, and then the access point 8 calls the personal computer communication center 30 through the public or private packet communication network 9. When the line control unit 31 in the personal computer communication center 30 returns an answer, the personal computer 1 and the personal computer communication center 30 are connected through the public telephone network 7 and the public or private packet communication network 9. Then, the subscriber A inputs an identification number (ID) of the subscriber A and a password from the personal computer 1 in accordance with a log-on procedure provided from the line control unit 31. The line control unit 31 examines the ID and the password. When the line control unit 31 determines that the ID and the password are acceptable, the line control unit 31 returns a top menu, to the personal computer 1. When the subscriber A selects an item corresponding to the transmission of an electronic mail in the menu, the line control unit 31 recognizes the selection and activates an operation of the electronic mail service control unit 32. Then, the electronic mail service control unit 32 transmits a message to prompt the subscriber A to input a text of the message, a title, a telephone-access number of a facsimile terminal to which the message is to be transmitted. The subscriber A inputs the text, the title, and the telephone-access number of the facsimile terminal 6 at the subscriber B, from the personal computer 1. The electronic mail service control unit 32 writes information on the transmission of the electronic mail from the subscriber A, in the electronic mail information control file 37, and transmits the text, the title, the name of sender-side subscriber, the identification number of the sender-side subscriber A, etc., to an access point 8 near the facsimile terminal 6 at the receiver-side subscriber B. The access point 8 is equipped with a facsimile adapter, and conversion of the text into a facsimile image is carried out in the facsimile adapter to transmit the transformed image the facsimile terminal 6 at the subscriber B. The above name of sender-side subscriber, the identification number of the sender-side subscriber A, the title, the date of the transmission, etc., are printed at the area of an output sheet of the facsimile terminal 6.

Figure 2B:
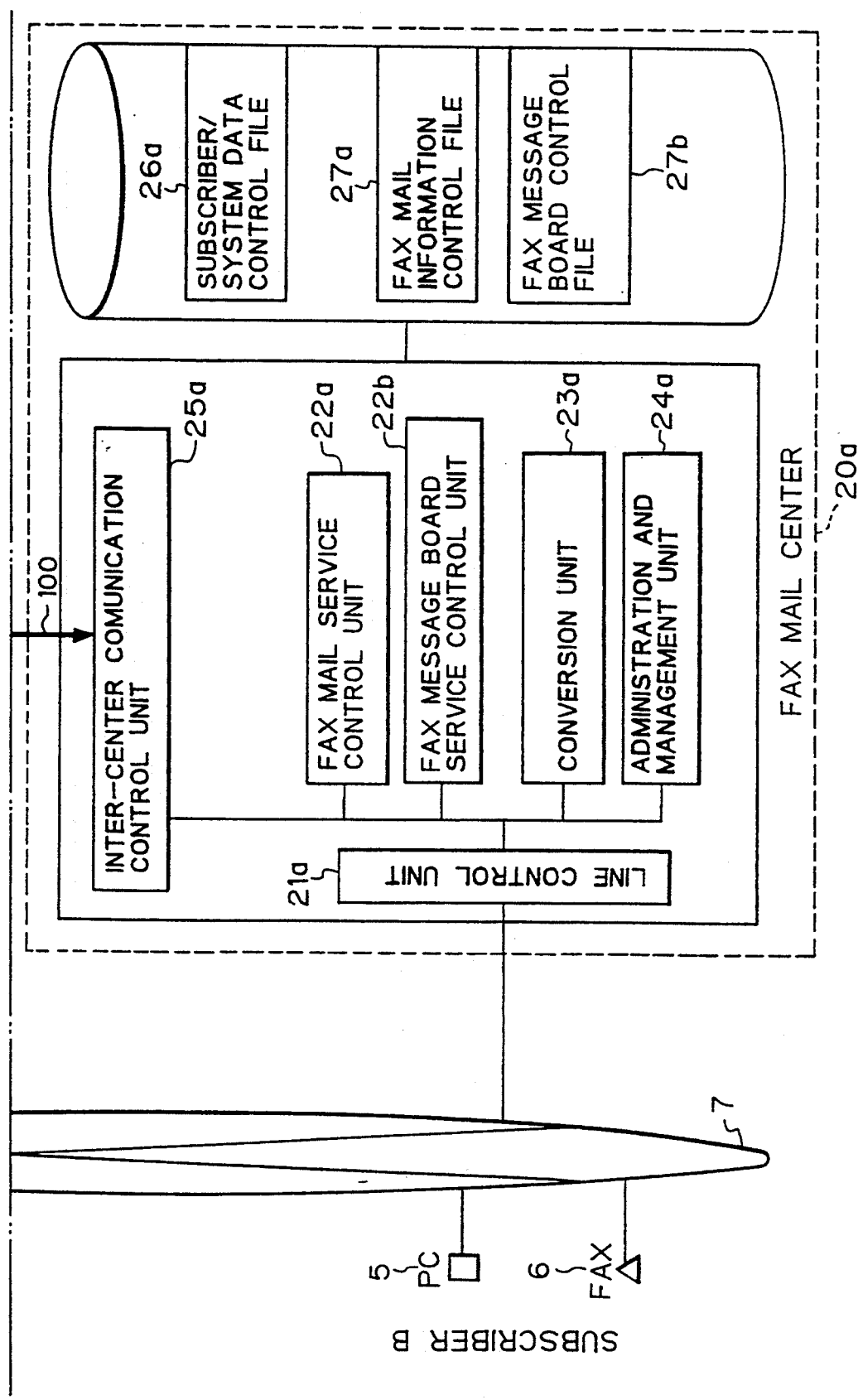
Figure 3A:
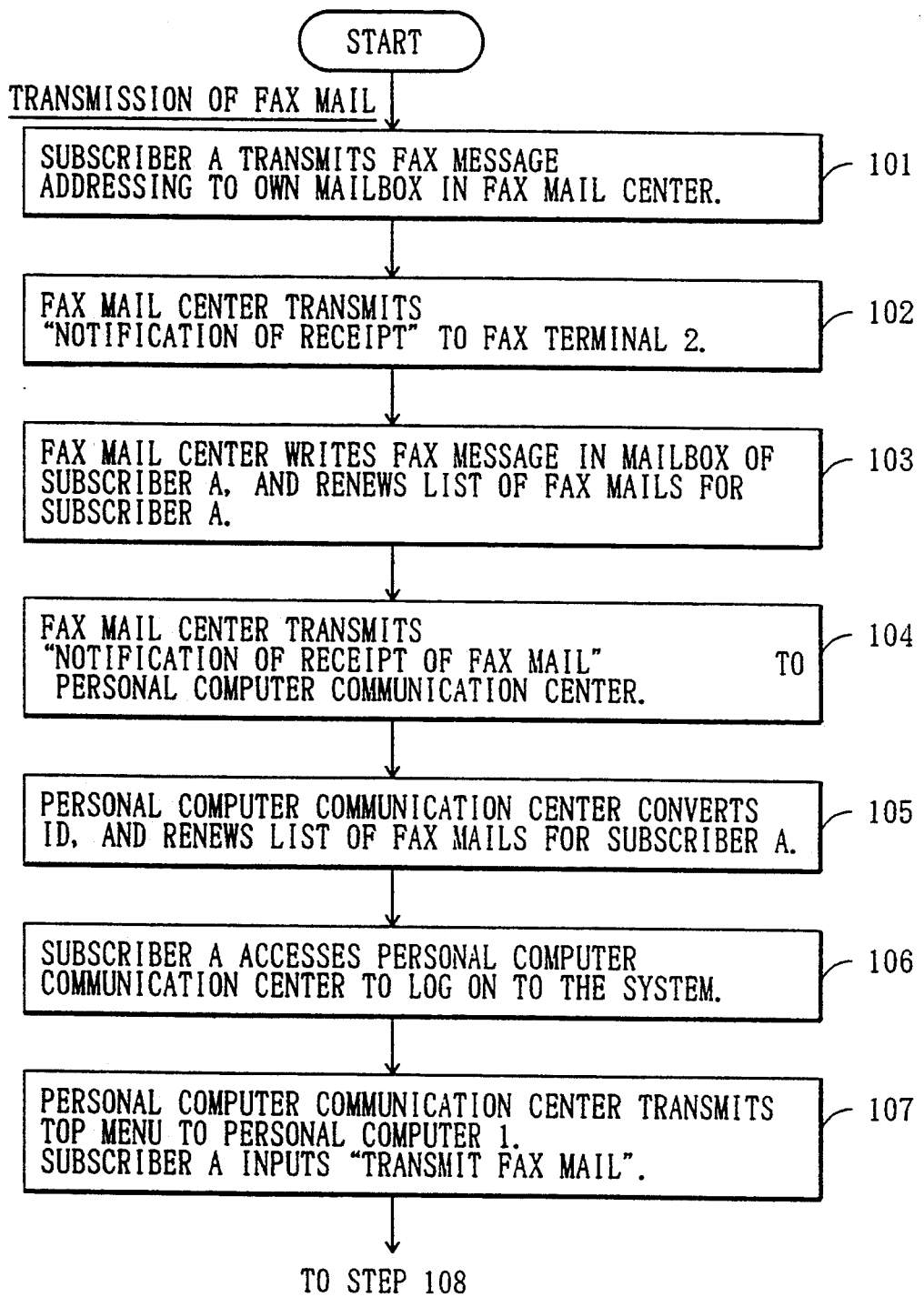

Construction of Embodiment (FIGS. 2A and 2B)

FIGS. 2A and 2B indicate a block diagram of a mail system according to the embodiment of the present invention. In FIGS. 2A and 2B, reference numeral 1 denotes a personal computer subscriber A, 2 denotes a facsimile terminal at a subscriber A, 5 denotes a personal computer at a subscriber B, 6 denotes a facsimile terminal at a subscriber B, 7 denotes a public telephone network, 8 denotes an access point to a personal computer communication system $10a$, 9 denotes a public or private packet communication network, $10a$ denotes a personal computer communication system, $11a$ denotes a line control unit, $12a$ denotes an electronic mail service control unit, $12b$ denotes an electronic message board service control unit, $12c$ denotes a forum information delivery service control unit, $13a$ denotes a facsimile mail/message board supporting service control unit, $14a$ denotes an administration and management unit, $15a$ denotes an inter-center communication control unit, $16a$ denotes a subscriber/system data control file, $17a$ denotes an electronic mail information control file, $17b$ denotes an electronic message board information control file, $17c$ denotes a forum/data base information control file, $18a$ denotes a facsimile mail/message board supporting information file, $20a$ denotes a facsimile mail center, $21a$ denotes a line control unit, $22a$ denotes a facsimile mail service control unit, $22b$ denotes a facsimile message board service control unit, $23a$ denotes a conversion unit, $24a$ denotes a administration and management unit, $25a$ denotes an inter-center communication control unit, $26a$ denotes a subscriber/system data control file, $27a$ denotes a facsimile mail information control file, $27b$ denotes a facsimile message board information control file, and 100 denotes a signal path. The units in FIGS. 2A and 2B having the same names as the corresponding units in FIGS. 1A and 1B, except the administration and management unit, respectively function in the same way as the corresponding units in FIGS. 1A and 1B.

In the construction of FIGS. 2A and 2B, each subscriber benefitted by the present invention, is assumed to have, or at least can use, both a personal computer, which can be connected with the personal computer communication center $10a$, and the facsimile terminal, which can be connected with the facsimile mail center $20a$. In addition, the personal computer and the facsimile terminal may be connected with the personal computer communication center $10a$ and the facsimile mail center $20a$, respectively, through a local area network (LAN).

The personal computer communication center $10a$ according to the present invention, supports the facsimile mail service in addition to the conventional services provided by the conventional personal computer communication center 30 in FIGS. 1A and 1B. The line control unit $11a$ is connected with a personal computer 1 at a subscriber A through a public or private packet communication network 9, the access point 8, and a public telephone network 7, and functions as an interface between the personal computer and the respective service control units $12a$, $12b$, $12c$, and $13a$ according to requests from the personal computer. The electronic mail service control unit $12a$ controls transmission and reception of electronic mails, renewal of the transmission and reception records, and mailboxes. The electronic message board service control unit $12b$ controls registration and reading of electronic message boards, and manages information for controlling the registration of electronic message boards. The forum information delivery service control unit $12c$ controls information on forum administration, information on the electronic conference, information on newspapers, stock prices, or the like, and accesses to data bases outside. The facsimile mail/message board supporting service control unit $13a$ supports a man-machine interface with a personal computer for a facsimile mail/message board service, and controls the facsimile mail/message board supporting information file $18a$ for linkage with the facsimile mail center $20a$. The administration and management unit $14a$ controls subscriber/system data, data of an operating state of the system, and a system fault. The inter-center communication control unit $15a$ controls communication with the inter-center communication control unit $25a$ in the facsimile mail center $20a$ for the facsimile delivery of electronic mails, and transmission and reception of facsimile mails. The subscriber/system data control file $16a$ stores system data for management of the personal computer communication center $10a$, service types of the respective subscribers, and the like. The electronic mail information control rile $17a$ stores control information on the mailboxes, a list of broadcast messages, transmission records, reception records, and the like. The electronic message board information control file $17b$ stores information on the electronic message boards, control information on the electronic message boards, and the like. The forum/data base information control file $17c$ stores information for forum administration, information on the electronic conference, information on news papers, stock prices, and the like. The facsimile mail/message board supporting information file 18a stores control information for supporting transmission and reception of facsimile mails, and the facsimile message board service, linked to and cooperating with the facsimile mail center 20a. The functions of the units are respectively realized by a software unit, and all the files are respectively provided in a storage device provided in the personal computer communication center 10a.

The facsimile mail center 20a supports transmission and reception of facsimile mails, and the facsimile message board service. The line control unit 21a is connected with the facsimile terminal at a subscriber through a public telephone network 7, and functions as an interface between the facsimile terminal and the respective service control units 22a and 22b according to requests from the facsimile terminal. The electronic mail service control unit 22a controls transmission and reception of electronic mails, renewal of the transmission and reception records, and services of various notifications. The facsimile message board service control unit 22b controls registration, deletion, and reading of facsimile message boards, and control information on the registration of facsimile message boards. The conversion unit 23a converts text information on the electronic mails and the additional information for facsimile mails into image data. The administration and management unit 24a controls subscriber/system data, data of an operating state of the system, and a system fault. The inter-center communication control unit 25a controls communication with the inter-center communication control unit 15a in the personal computer communication center 10a, through the signal path 100, for the facsimile delivery of facsimile mails, and transmission and reception of facsimile mails. The signal path 100 may include a communication network. The subscriber/system data control file 26a stores system data for management of the facsimile mail center 20a, service types of the respective subscribers, and the like. The facsimile mail information control file 27a stores control information on the mailboxes, a list of broadcast messages, transmission records, reception records, and the like. The facsimile message board information control file 27b stores information on the facsimile message boards, control information on the facsimile message boards, and the like. The functions of the units are respectively realized by a software unit, and all the above files are respectively provided in a storage device provided in the facsimile mail center 20a.

The operations of the transmission and reception of the facsimile mail centers, the facsimile delivery of electronic mails, the registration and reading of the facsimile message boards, and the registration of a subscriber, are explained below. In the following explanations, it is assumed that the identification numbers in the personal computer communication center 10a and the facsimile mail center 20a are independently assigned to each subscriber.

Operations of Transmission and Reception of Facsimile Mails (FIGS. 3A to 3D and 4A and 4D)

Figure 4B:
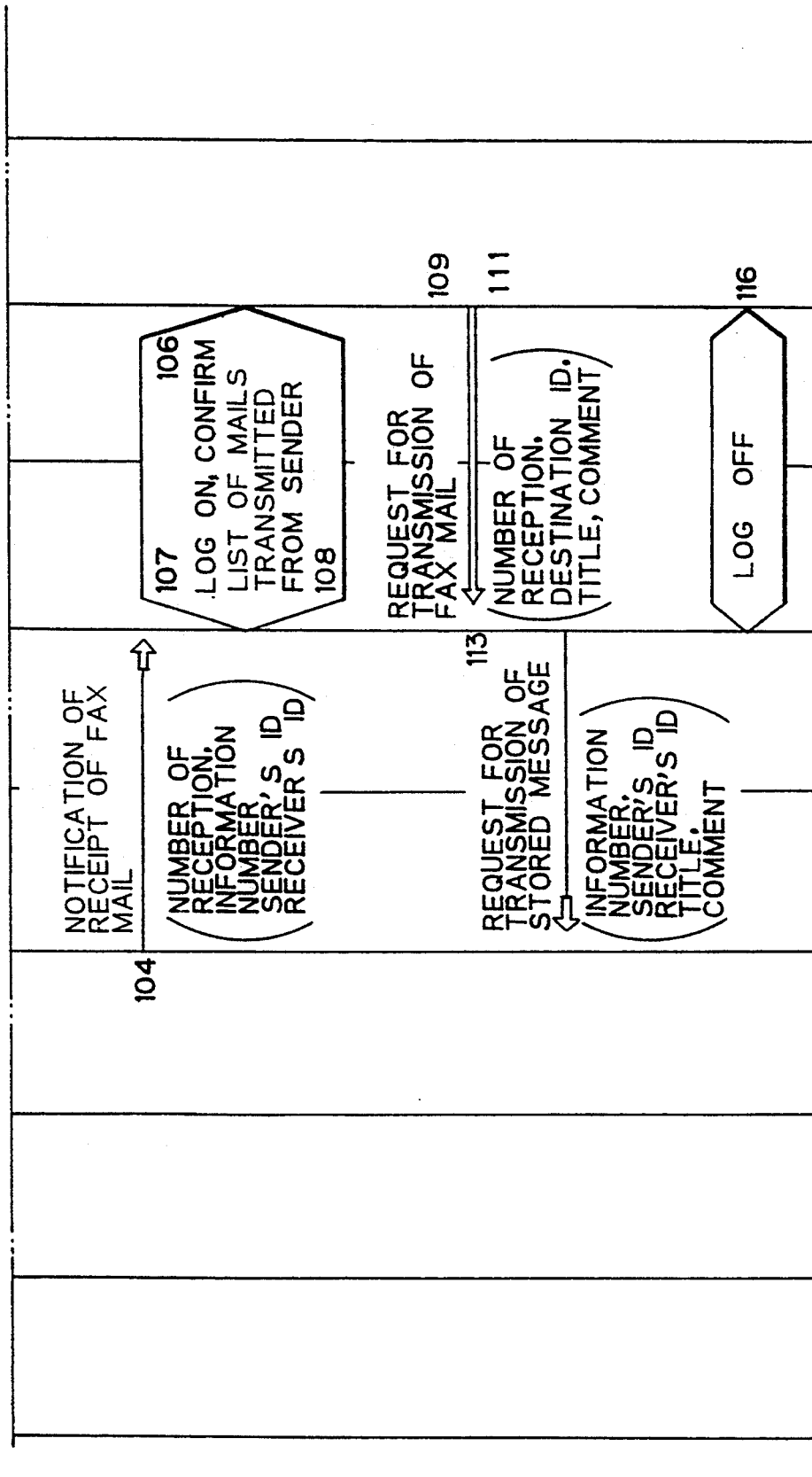
Figure 4C:
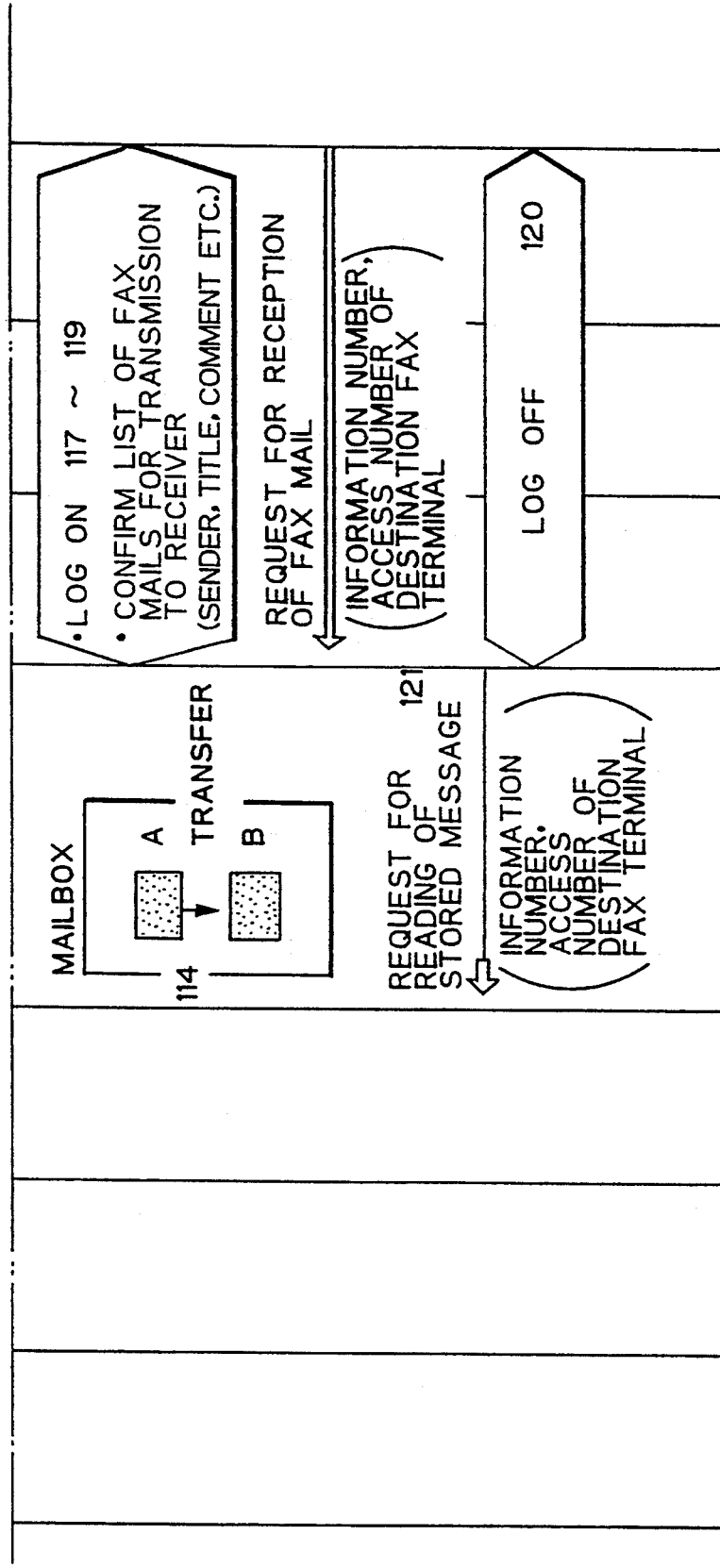
Figure 4D:
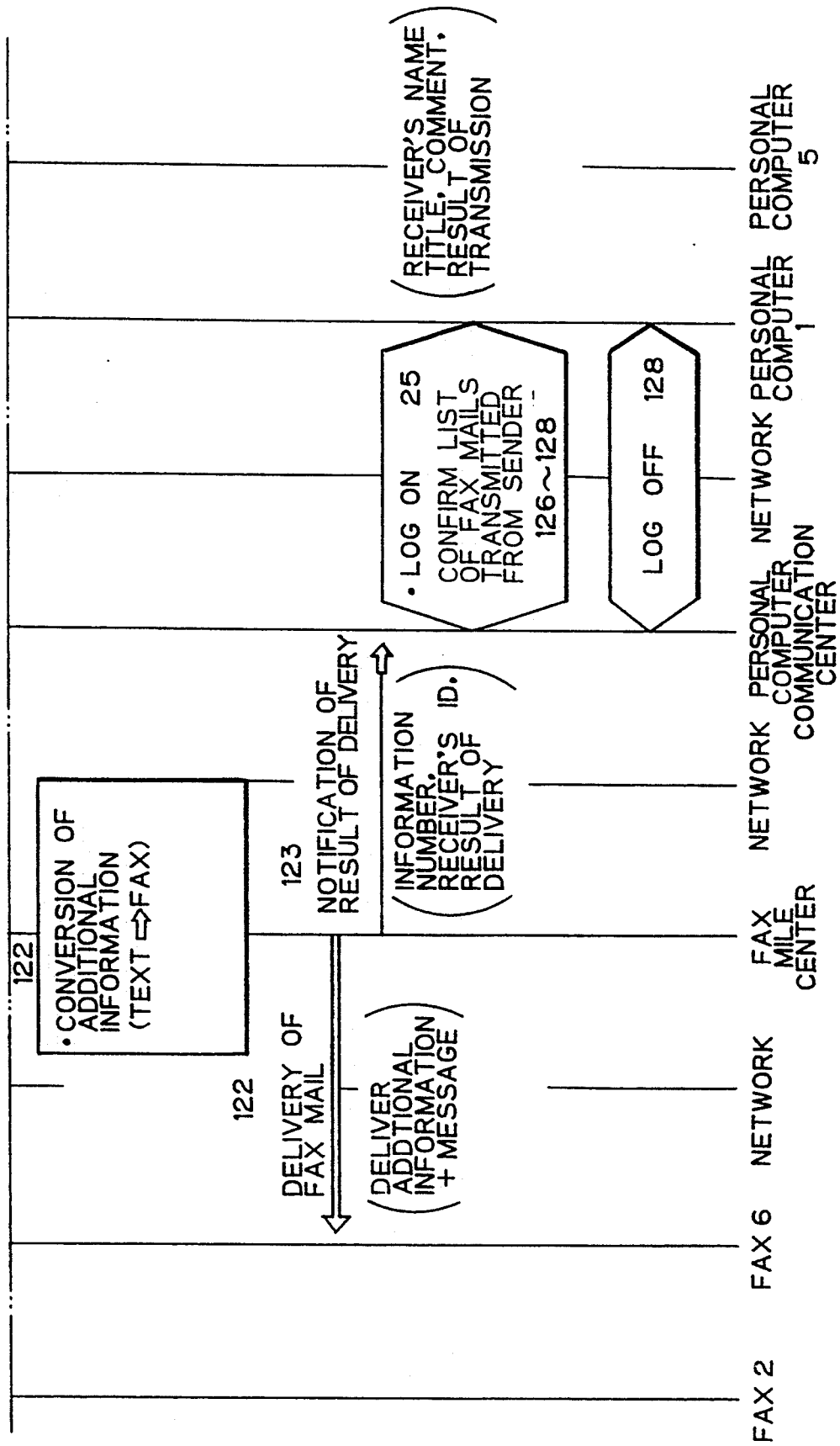
Figure 5B:
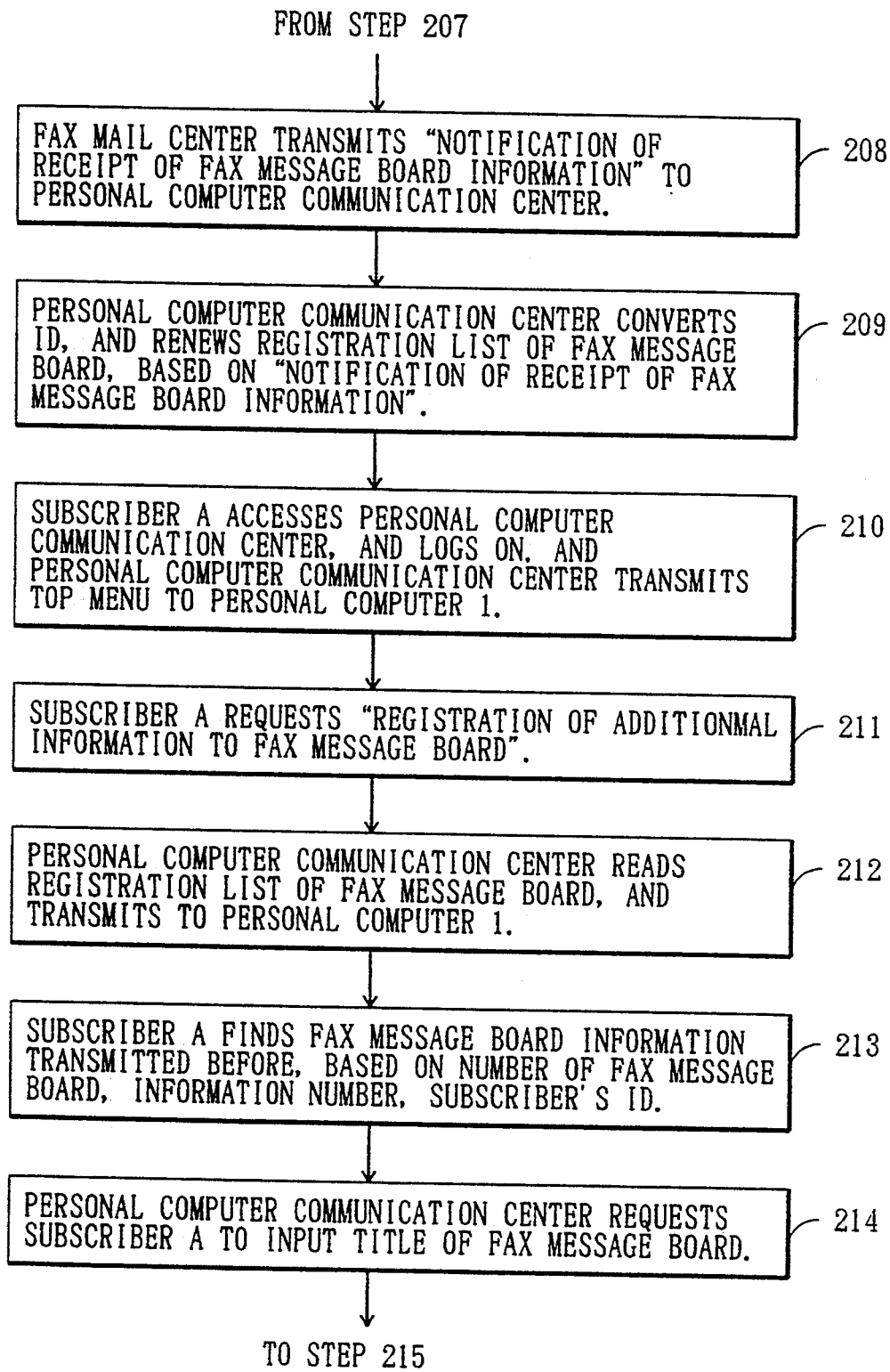
Figure 5D:
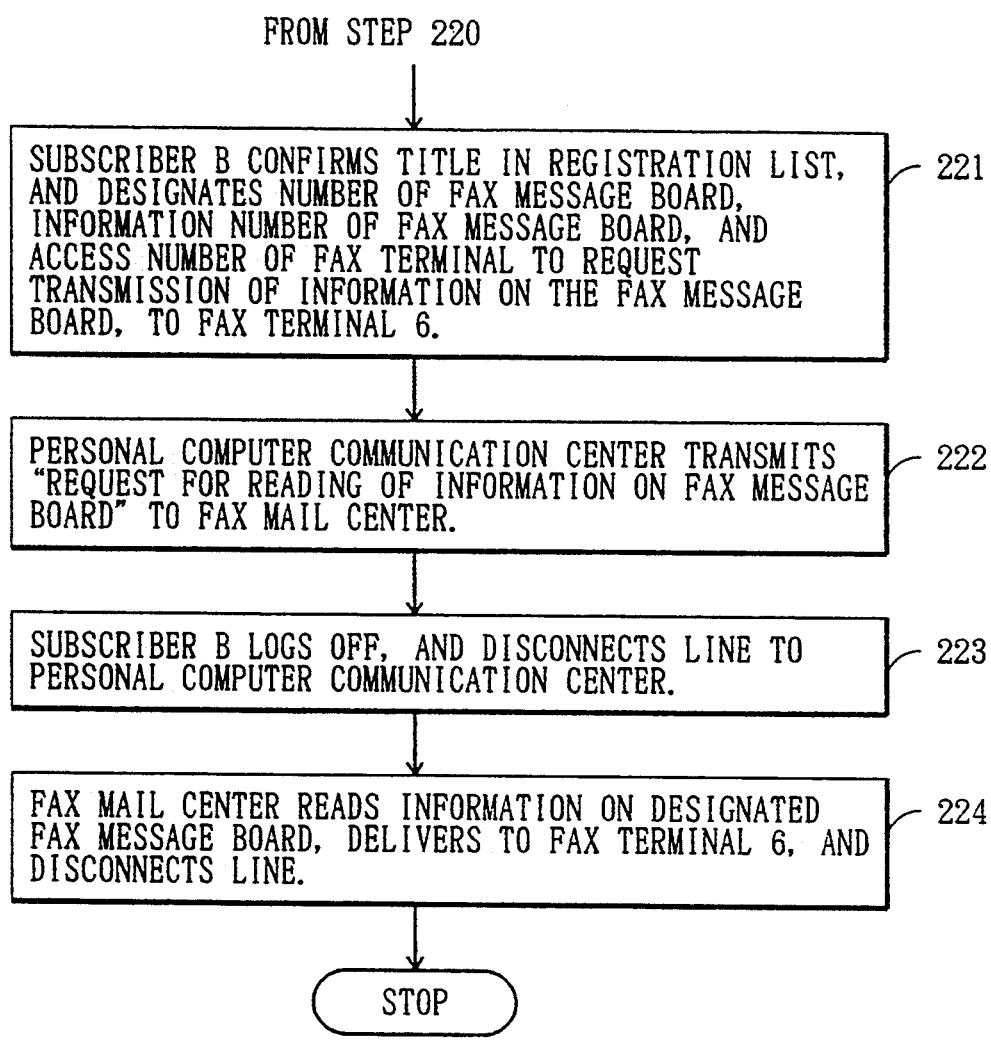
Figure 6D:
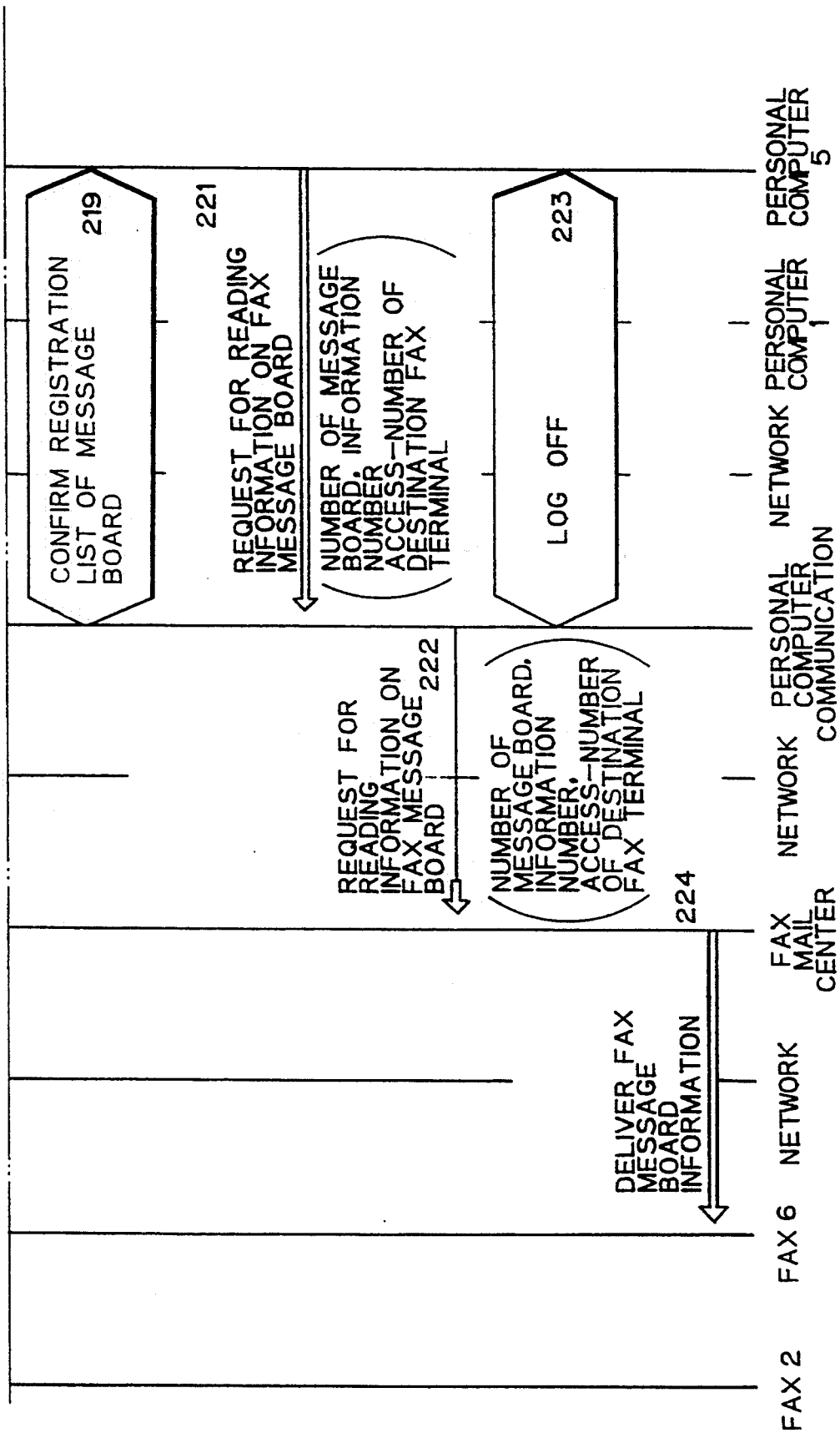

FIGS. 3A to 3D indicate a flowchart of operations of transmission and reception of a facsimile mail, and FIGS. 4A and 4D show a sequence diagram of operations of transmission and reception of a facsimile mail, where each number of three figures indicates a number of a corresponding step in FIGS. 3A to 3D.

STEP 101: The subscriber A dials a telephone-access number of the facsimile mail center 20a from the facsimile terminal 2 at the subscriber A to request a connection of a line between the facsimile mail center 20a and the facsimile terminal 2 through the public telephone network 7, to the exchange in the public telephone network 7. The exchange calls the facsimile mail center 20a. The line control unit 21a in the facsimile mail center 20a responds to the call from the exchange to connect the facsimile mail center 20a with the facsimile terminal 2 through the public telephone network 7. The Subscriber A attaches an OMR sheet on the top of a message to be transmitted by a facsimile mail, transmits the message from the facsimile terminal 2, and disconnects the line to the facsimile mail center 20a. An identification number of the sender-side subscriber A, a password, an identification number of the receiver-side subscriber, and a function code are written in the OMR sheet by marking.

STEP 102: The line control unit 21a examines the OMR sheet to check the qualifications of the subscriber A and recognize the request by the subscriber A. When the line control unit 21a determines that the ID and the password are acceptable, and recognizes that transmission of a facsimile mail is requested, the line control unit 21a activates an operation of the facsimile mail service control unit 42. The facsimile mail service control unit 42 makes the line control unit 21a dial the telephone-access number of the facsimile terminal 2 to connect the facsimile mail center 20a with the facsimile terminal 2, and transmits an acknowledgment of reception (which contains a reception number, a date of reception, the identification number of the sender-side subscriber A, the result of the reception, and the like) to the facsimile terminal 2 through the line control unit 21a.

STEP 103: The facsimile mail service control unit 22a writes the received message in a mailbox for the subscriber A, and renews the record of transmission and reception for the subscriber A.

STEP 104: The inter-center communication control unit 25a in the facsimile mail center 20a transmits a notification of receipt of a facsimile mail (the notification contains the reception number, a number of stored information, the identification number of the sender-side subscriber A, the identification number of the receiver-side subscriber, and the like) to the inter-center communication control unit 15a in the personal computer communication center 10a.

STEP 105: When the inter-center communication control unit 15a in the personal computer communication center 10a receives the above notification of receipt of a facsimile mail, the inter-center communication control unit 15a activates the facsimile mail/message board supporting service control unit 13a. The facsimile mail/message board supporting service control unit 13a converts the identification numbers in the facsimile mail center 20a to identification numbers in the personal computer communication center 10a, and renews a record of transmission of facsimile mails for the subscriber A in the facsimile mail/message board supporting information file 18a.

STEP 106: The subscriber A dials the telephone-access number of the access point to the personal computer communication center 10a to request the exchange in the public telephone network 7 to connect the personal computer 1 with the access point 8 to the personal computer communication center 10a through the public telephone network 7. The exchange calls the access point 8, and then the access point 8 calls the personal computer communication center 10a through the public or private packet communication network 9. When the line control unit 11a in the personal computer communication center 10a responds to the call, the personal computer 1 and the personal computer communication center 10a are connected through the public telephone network 7 and the public or private packet communication network 9. The subscriber A inputs an identification number of the sender-side subscriber A (in the personal computer communication center 10a) and a password in accordance with a log-on service provided by the line control unit 11a.

STEP 107: The line control unit 11a examines qualifications of the subscriber A. When the line control unit 11a determines that the subscriber is qualified, (i.e., the identification number and the password are determined to be acceptable), the line control unit 11a returns a top menu to the personal computer 1. The subscriber A selects "transmission of a facsimile mail" from the menu.

STEP 108: The line control unit 11a activates the facsimile mail/message board supporting service control unit 13a. The facsimile mail/message board supporting service control unit 13a reads a list of mails transmitted from sender for the subscriber A from the facsimile mail/message board supporting information file 18a, and transmits the same to the personal computer 1.

STEP 109: The subscriber A finds the number of the above-mentioned notification of receipt received from the facsimile mail center 20a when the above-mentioned facsimile mail is transmitted to the facsimile mail center 20a, among facsimile mails which have not been transmitted yet, in the list of mails transmitted from sender for the subscriber A, and then requests the personal computer communication center 10a to transmit the facsimile mail to the subscriber A.

STEP 110: The facsimile mail/message board supporting service control unit 13a requests the personal computer 1 to input a title of the message of the facsimile mail, a comment to be attached to the message, and an identification number of a subscriber to which the facsimile mail is to be transmitted.

STEP 111: The subscriber A inputs the title, the comment, and the identification number of the subscriber B as a receiver-side subscriber.

STEP 112: The facsimile mail/message board supporting service control unit 13a writes the identification numbers of the sender-side subscriber A and the receiver-side subscriber, the number of reception, the title of the message, the comment, and the like, in the list of mails transmitted from sender for the subscriber A and the list of mails to be transmitted to receiver for the subscriber B in the facsimile mail/message board supporting information file 18a.

STEP 113: The facsimile mail/message board supporting service control unit 13a converts the above identification numbers in the personal computer communication center 10a to respective identification numbers in the facsimile mail center 20a, and activates the inter-center communication control unit 15a to request the inter-center communication control unit 15a to transmit a request for transmission of a stored facsimile mail. The inter-center communication control unit 15a transmits the request for transmission of stored facsimile mail (the request contains the number of stored information, the identification number of the sender-side subscriber A, the identification number of the receiver-side subscriber B, the title, the comment, and the like) to the inter-center communication control unit 25a in the facsimile mail center 20a.

STEP 114: When the inter-center communication control unit 25a in the facsimile mail center 20a receives the above request for transmission of a stored facsimile mail, the inter-center communication control unit 25a activates the facsimile mail service control unit 22a. The facsimile mail service control unit 22a transfers the designated facsimile mail stored in the mailbox for the subscriber A to a mailbox for the subscriber B.

STEP 115: The facsimile mail service control unit 22a reads the identification number of the sender-side subscriber, the name of the sender-side subscriber corresponding to the identification number, the name of the receiver-side subscriber, addresses of the sender-side subscriber and the receiver-side subscriber, and writes the same in the records of transmission and reception in the facsimile mail information control file 27a, together with the title and the comment.

STEP 116: The subscriber A logs off the system, and disconnects the line to the personal computer communication center 10a.

STEP 117: The subscriber B dials the telephone-access number of the access point 8 from the personal computer 5 to request the exchange in the public telephone network 7 to connect the personal computer 5 with the personal computer communication center 10a. The exchange calls the access point 8, and then the access point 8 calls the personal computer communication center 10a. The line control unit 11a in the personal computer communication center 10a responds to the call to connect the personal computer communication center 10a with the personal computer 5 through the public or private packet communication network 9 and the public telephone network 7. The subscriber B inputs the identification number of the subscriber B, and a password in accordance with the log-on service provided by the line control unit 11a. The line control unit 11a examines qualifications of the subscriber B. When the line control unit 11a determines that the subscriber is qualified, (i.e., the identification number and the password are determined to be acceptable), the line control unit 11a returns a top menu to the personal computer 5.

STEP 118: The subscriber B recognizes that a facsimile mail is stored in the mailbox for the subscriber B, and selects "reception of a facsimile mail" from the menu. The line control unit 11a activates the facsimile mail/message board supporting service control unit 13a.

STEP 119: The facsimile mail/message board supporting service control unit 13a reads the record of reception of for the subscriber B in the facsimile mail/message board supporting information file 18a, and transmits the same to the personal computer 5 through the line control unit 11a. The subscriber B confirms the name of the sender-side subscriber, the title, the comment, and the like, in the list of mails to be transmitted to receiver for the subscriber B, designates the number of the stored information and the telephone-access number of the facsimile terminal 6 to which the stored facsimile mail is to be output, and requests to transmit the facsimile mail to the designated facsimile terminal 6.

STEP 120: the subscriber B logs off the system, and disconnects the line to the personal computer communication center 10a.

STEP 121: The facsimile mail/message board supporting service control unit 13a in the personal computer communication center 10a activates the inter-center communication control unit 15a to request for transmitting a request to read a stored facsimile mail. The inter-center communication control unit 15a transmits the request to read a stored facsimile mail (the request contains the number of stored information, the telephone-access number of the facsimile terminal, and the like) to the inter-center communication control unit 25a in the facsimile mail center 20a.

STEP 122: When the inter-center communication control unit 25a receives the request to read a stored facsimile mail, the inter-center communication control unit 25a activates the facsimile mail service control unit 22a. The facsimile mail service control unit 22a reads the above-mentioned additional information to be attached to the designated facsimile mail, from the record of reception in the facsimile mail information control file 27a, converts the text information on the additional information for the facsimile mail into image data, reads the designated facsimile mail from the mailbox, attaches the converted additional information thereto, and requests the line control unit 21a to transmit the facsimile mail to the facsimile terminal 6. The line control unit 21a calls the facsimile terminal 6, transmits the facsimile mail thereto, and disconnects the line to the facsimile terminal 6.

STEP 123: The line control unit 21a notifies the electronic mail service control unit 22a of the result of the transmission to the facsimile terminal 6. The electronic mail service control unit 22a renews the record of transmission based on the result of the transmission, and requests the inter-center communication control unit 25a to transmit the notification of the result of the transmission. The inter-center communication control unit 25a transmits the notification of the result of the transmission to the inter-center communication control unit 15a in the personal computer communication center 10a.

STEP 124: When the inter-center communication control unit 15a receives the above notification, the inter-center communication control unit 15a activates the facsimile mail/message board supporting service control unit 13a. The facsimile mail/message board supporting service control unit 13a converts the identification numbers in the facsimile mail center 20a to the personal computer communication center 10a, and renews the list of mails transmitted from sender for the subscriber A in the facsimile mail/message board supporting information file 18a, based on the above result of the transmission.

STEP 125: The subscriber A connects the personal computer 1 with the personal computer communication center 10a as described before, and logs on the system.

STEP 126: The line control unit 11a in the personal computer communication center 10a transmits a top menu to tile personal computer 1 of the subscriber A, and the subscriber A selects the "record of transmission for facsimile mails" from the menu.

STEP 127: The line control unit 11a activates the facsimile mail/message board supporting service control unit 13a. The facsimile mail/message board supporting service control unit 13a reads the record of transmission for facsimile mails for the subscriber A in the facsimile mail/message board supporting information file 18a, and transmits the same to the personal computer 1 through the line control unit 11a.

STEP 128: The subscriber A Confirms the result of the transmission by the list of mails transmitted from sender for the subscriber A.

STEP 129: The subscriber A logs off the system, and disconnects the line to the personal computer communication center 10a.

Thus, according to the present invention, the transmission and reception of a facsimile mail, can be controlled by transmitting a command from a personal computer connected to a personal computer communication center.

Operations of Registration and Reading of Facsimile Message Boards (FIGS. 5A to 5D and 6A to 6D)

FIGS. 5A to 5D show a flowchart of registration and reading operations of a facsimile message board information. FIGS. 6A to 6D show a sequence diagram of registration and reading operations of a facsimile message board information.

STEP 201: The subscriber A dials a telephone-access number of the facsimile mail center 20a from the facsimile terminal 2 to request the exchange in the public telephone network 7 to connect a line between the facsimile mail center 20a and the facsimile terminal 2 through the public telephone network 7. The exchange calls the facsimile mail center 20a. The line control unit 21a in the facsimile mail center 20a responds to the call from the exchange to connect the facsimile mail center 20a with the facsimile terminal 2 through the public telephone network 7. The subscriber A transmits an identification number of the subscriber A to the facsimile mail center 20a by pushing the push buttons in accordance with a voice guidance message from the line control unit 21a.

STEP 202: The subscriber A transmits a password to the facsimile mail center 20a by pushing the push buttons.

STEP 203: The line control unit 21a examines the qualification of the subscriber A. When the line control unit 21a determines that the ID and the password are acceptable, the line control unit 21a transmits a voice guidance message to the subscriber A to prompt the subscriber A to input a function code.

STEP 204: The subscriber A transmits a function code of the "registration of facsimile message board information" to the facsimile mail center 20a by pushing the push buttons. When the line control unit 21a detects the function code of the "registration of facsimile message board information", the line control unit 21a activates the facsimile message board service control unit 22b. The facsimile message board service control unit 22b transmits a voice guidance message to prompt the subscriber A to input a number of the facsimile message board, to the subscriber A through the line control unit 21a. It is assumed that a plurality of facsimile message boards are provided in the facsimile mail center 20a, and the numbers are assigned thereto to identify the respective facsimile message boards.

STEP 205: The facsimile message board service control unit 22b determines whether or not an information number is available in the facsimile message board of the designated number, and notifies the subscriber A of an available information number when it is determined that an information number is available.

STEP 206: The subscriber A transmits information which is to be registered in the facsimile message board, to the facsimile mail center 208, and then disconnects the line.

STEP 207: When the subscriber A receives the above information, the facsimile message board service control unit 22b writes the information in the facsimile message board information control file 27b, activates the inter center communication control unit 25a, and requests the inter-center communication control unit 25a to transmit a notification of the receipt of the facsimile message board information.

STEP 208: The inter-center communication control unit 25a in the facsimile mail center 20a transmits the notification (which contains the number of the facsimile message board, the information number, the identification number of the subscriber who registers the facsimile message board information, and the like) of the receipt of the facsimile message board information, to the inter-center communication control unit 15a in the personal computer communication center 10a.

STEP 209: When the inter-center communication control unit 15a receives the above notification of the receipt of the facsimile message board information, the inter-center communication control unit 15a activates the facsimile mail/message board supporting service control unit 13a. The facsimile mail/message board supporting service control unit 13a converts the identification number in the facsimile mail center 20a to a corresponding identification number in the personal computer communication center 10a, and writes the content of the notification, together with the converted identification number, in the facsimile mail/message board supporting information file 18a.

STEP 210: The subscriber A connects the personal computer 1 with the personal computer communication center 10a as described before. The subscriber A transmits the identification number and the password in accordance with the log-on service provided by the line control unit 11a. The line control unit 11a examines the qualification of the subscriber A. When the line control unit 11a determines that the ID and the password are acceptable, the line control unit 11a transmits a top menu to the personal computer 1.

STEP 211: The subscriber A selects the "registration of additional information to facsimile message board information" from the menu.

STEP 212: The line control unit 11a in the personal computer communication center 10a activates the facsimile mail/message board supporting service control unit 13a. The facsimile mail/message board supporting service control unit 13a reads a registration list of the facsimile message board in the facsimile mail/message board supporting information file 18a, and transmits the same to the personal computer 1.

STEP 213: The subscriber A finds the information, which has been transmitted before from the facsimile terminal 5, in the registration list of the facsimile message board, based on the number of the facsimile message board, the information number, and the identification number of the subscriber who registered the facsimile message board information, and requests the personal computer communication center 10a to register additional information to be attached to the facsimile message board information.

STEP 214: The facsimile mail/message board supporting service control unit 13a requests the subscriber A to input a title of the facsimile message board information.

STEP 215: The subscriber A inputs the title of the facsimile message board information.

STEP 216: When the facsimile mail/message board supporting service control unit 13a receives the above title of the facsimile message board information, the facsimile mail/message board supporting service control unit 13a writes the same in the registration list of the facsimile message board in the facsimile mail/message board supporting information file 18a.

STEP 217: The subscriber A logs off the system, and disconnects the line to the personal computer communication center 10a.

STEP 218: The subscriber B connects the personal computer 5 with the personal computer communication center 10a as described before. The subscriber B inputs the identification number of the subscriber B and the password in accordance with the log-on service provided by the line control unit 11a. The line control unit 11a examines qualifications of the subscriber B. when the line control unit 11a determines that the subscriber is qualified, (i.e., the identification number and the password are determined to be acceptable), the line control unit 11a returns a top menu to the personal computer 5.

STEP 219: The subscriber B selects "reception of a facsimile mail" from the menu.

STEP 220: The line control unit 11a activates the facsimile mail/message board supporting service control unit 13a, and the facsimile mail/message board supporting service control unit 13a reads the registration list of the facsimile message board in the facsimile mail/message board supporting information file 18a, and transmits the same to the personal computer 5.

STEP 221: The subscriber B confirms the title information in the registration list of the facsimile message board, and transmits the number of the facsimile message board and the information number which the subscriber B wishes to receive, and the telephone-access number of the facsimile terminal from which the subscriber B wishes to receive the facsimile message board information, i.e., the number of the facsimile terminal 6, to the personal computer communication center 10a. The facsimile mail/message board supporting service control unit 13a requests the inter-center communication control unit 15a to transmit a request for reading facsimile message board information.

STEP 222: The inter-center communication control unit 15a transmits the request for reading facsimile message board information (the request contains the number of the facsimile message board and the information number which the subscriber B wishes to receive, and the telephone-access number of the facsimile terminal from which the subscriber B wishes to receive the facsimile message board information), to the inter-center communication control unit 25a in the facsimile mail center 20a.

STEP 223: The subscriber B logs off the system, and disconnects the line to the personal computer communication center 10a.

STEP 224: When the inter-center communication control unit 25a receives the above request, the inter-center communication control unit 25a activates the facsimile message board service control unit 22b. The facsimile message board service control unit 22b reads the facsimile message board information from the facsimile message board information control file 27b, and requests the line control unit 21a to transmit the facsimile message board information. The line control unit 21a calls the facsimile terminal 6, transmits the facsimile message board information thereto, and disconnects the line to the facsimile terminal 6.

Thus, according to the present invention, the registration and reading of a content of a message board can be controlled by transmitting a command from a personal computer connected to a personal computer communication center.

Operations of Facsimile Delivery of Electronic Mail
(FIGS. 7A to 7C and 8A to 8C)

Figure 7B:
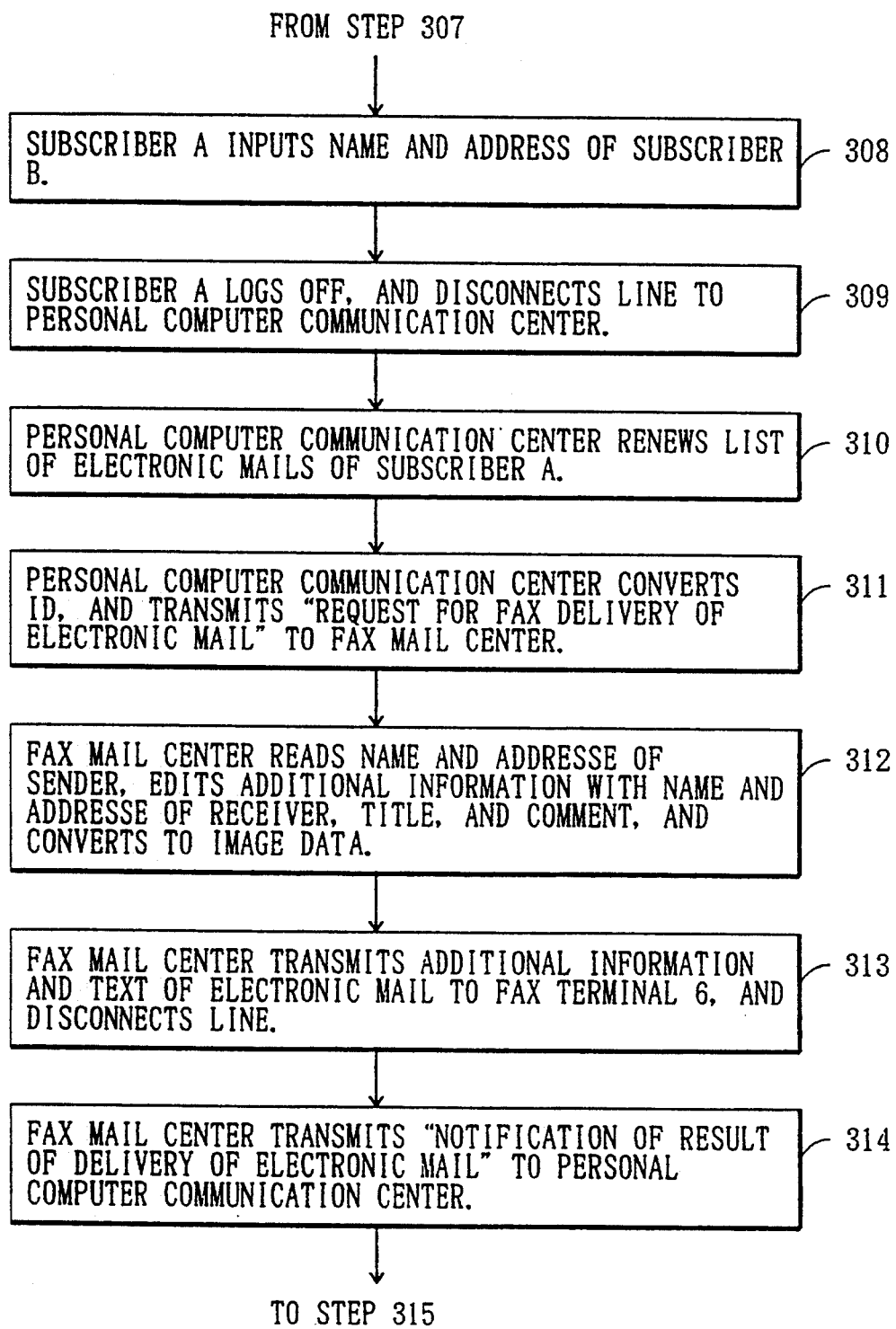
Figure 8A:
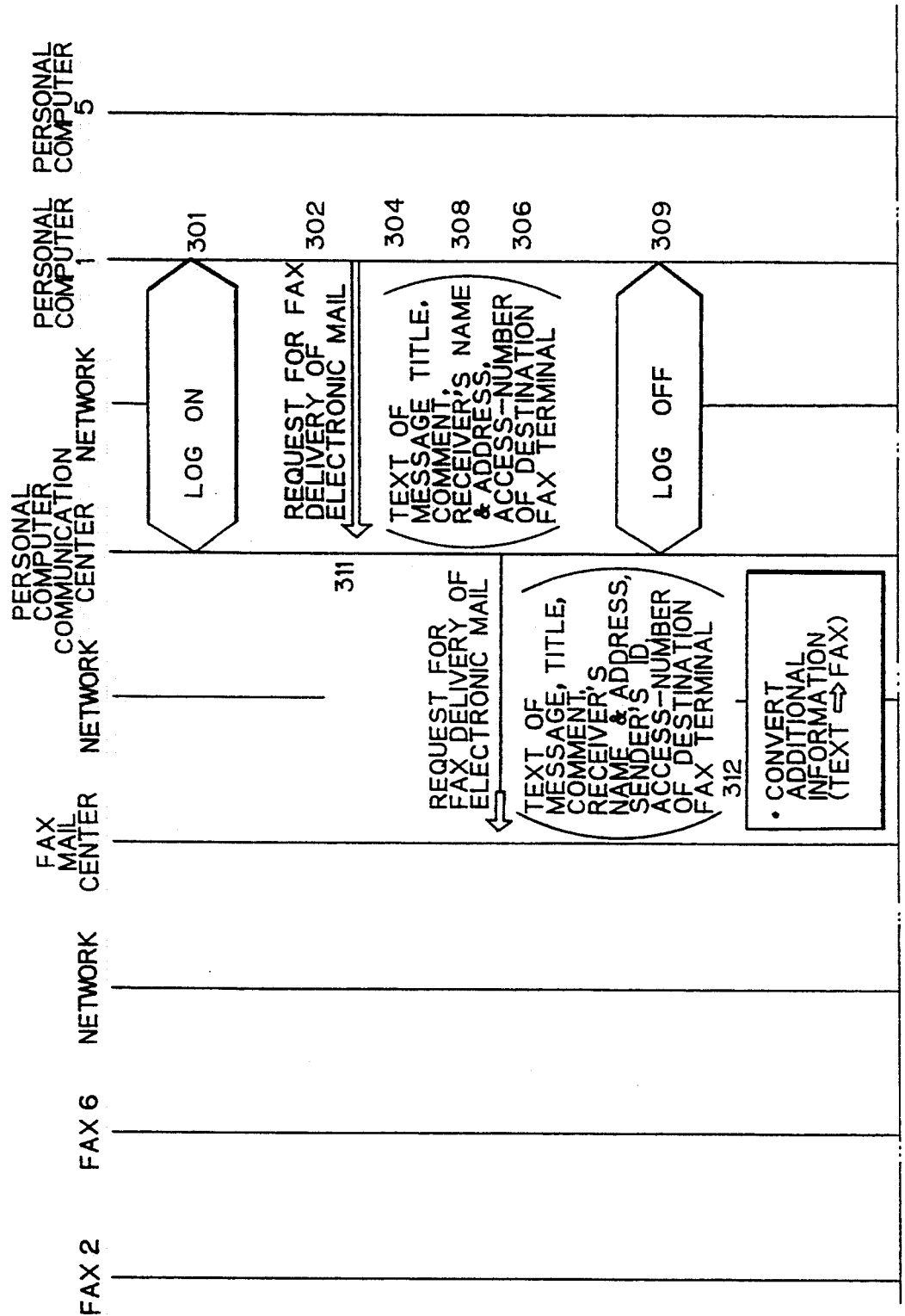
Figure 8C:
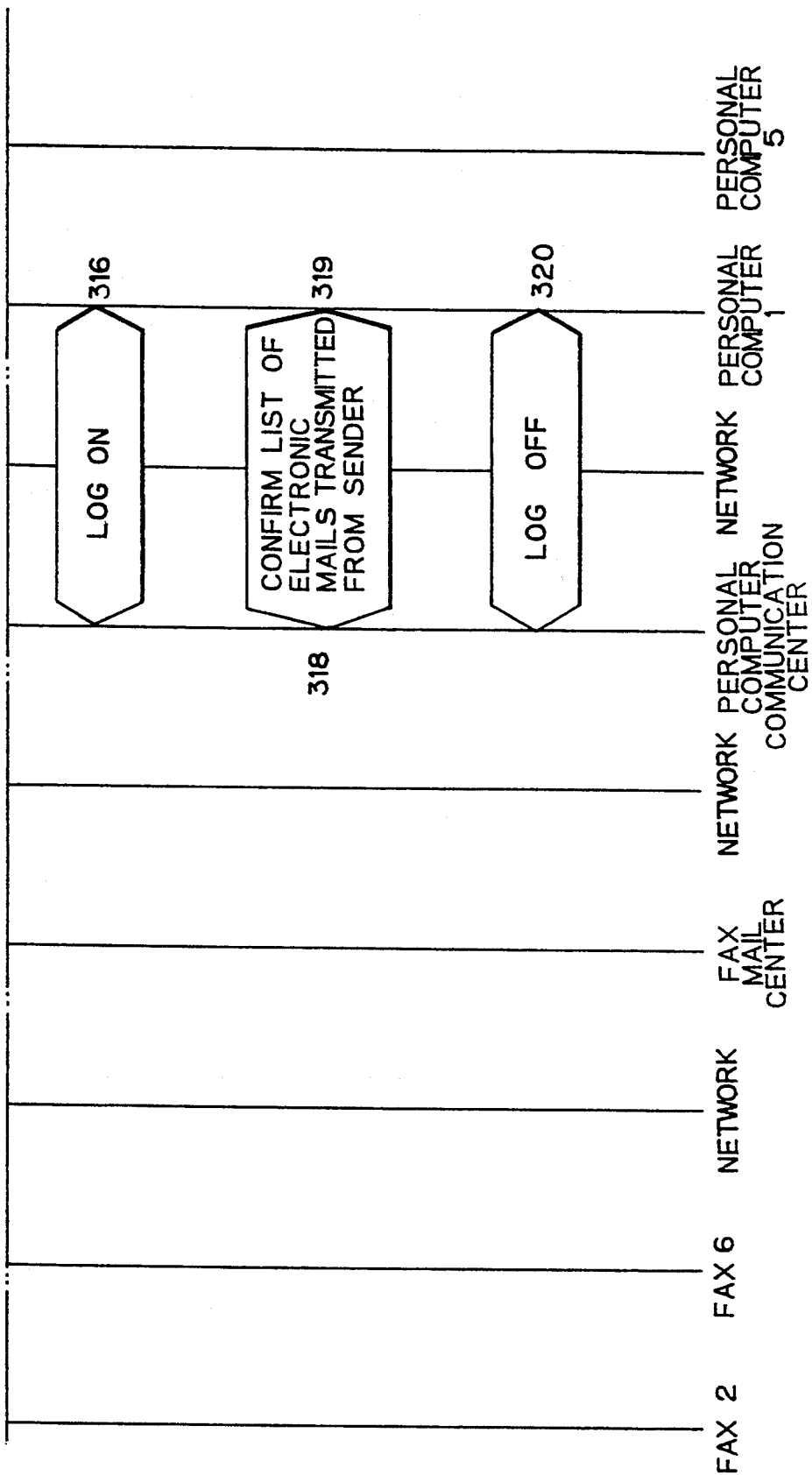

FIGS. 7A to 7C show a flowchart of operations of facsimile delivery of an electronic mail, and FIGS. 8A to 8C indicate a sequence diagram of operations of facsimile delivery of an electronic mail.

STEP 301: The subscriber A connects the personal computer 1 with the personal computer communication center 10a as described before. The subscriber A transmits the identification number and the password in accordance with the log-on service provided by the line control unit 11a. The line control unit 11a examines the qualification of the subscriber A. When the line control unit 11a determines that the ID and the password are acceptable, the line control unit 11a transmits a top menu to the personal computer 1.

STEP 302: The subscriber A selects the "transmission of electronic mail" from the menu.

STEP 303: The line control unit 11a activates the electronic mail service control unit 12a. The electronic mail service control unit 12a requests the personal computer 1 to input a text of a message, a title of the message, and a comment attached to the message.

STEP 304: The subscriber A inputs the text of a message, the title of the message, and the comment attached to the message.

STEP 305: The electronic mail service control unit 12a requests the personal computer 1 to input a destination address of the electronic mail.

STEP 306: The subscriber A inputs the telephone-access number of the facsimile terminal 6, as the destination address of the electronic mail, from the personal computer 1.

STEP 307: The electronic mail service control unit 12a requests the personal computer 1 to input a name of the receiver-side subscriber, and an address of the receiver-side subscriber.

STEP 308: The subscriber inputs the name and address of the subscriber B from the personal computer 1.

STEP 309: The subscriber A logs off the system, end disconnects the line to the personal computer communication center 10a.

STEP 310: The electronic mail service control unit 12a renews the list of mails transmitted from sender for the subscriber A in electronic mail information control file 17a.

STEP 311: The electronic mail service control unit 12a converts the identification number in the personal computer communication center 10a to a corresponding identification number in the facsimile mail center 20a, and requests the inter-center communication control unit 15a to deliver the electronic mail in the form of facsimile (a request for facsimile delivery of the electronic mail). The inter-center communication control unit 15a transmits the request for facsimile delivery of the electronic mail, to the inter-center communication control unit 25a in the facsimile mail center 20a. The request contains the text of the message, the title, the comment, the name and address of the receiver-side subscriber, and the telephone-accede number of the facsimile terminal 6.

STEP 312: When the inter-center communication control unit 25a receives the above request for facsimile delivery of the electronic mail, the inter-center communication control unit 25a activates the facsimile mail service control unit 22a. The facsimile mail service control unit 22a reads the name and address of the sender-side subscriber corresponding to the identification number of the sender-side subscriber from the subscriber/system data control file 26a, converts the text information of the names and addressee of the sender-side and receiver-side subscribers, the title, and the comment into image information to generate additional information to be attached to the subscriber, and converts the text information of the message of the electronic mail into image information.

STEP 313: The facsimile mail service control unit 22a requests the line control unit 21a to transmit the above additional information as a cover sheet, and then transmit the above message on the second sheet and the following sheets, to the facsimile terminal 6. After the transmission of the above facsimile mail (facsimile delivery of the electronic mail) is completed, the line control unit 21a disconnects the line to the facsimile terminal 6.

STEP 314: The line control unit 21a in the facsimile mail center 20a notifies the facsimile mail service control unit 22a of the result of the transmission (delivery) to the facsimile terminal 6. The facsimile mail service control unit 22a requests the inter-center communication control unit 25a to transmit the result of the transmission (delivery) to the facsimile terminal 6 to the inter-center communication control unit 15a. The inter-center communication control unit 25a transmits a notification of the result of the transmission (delivery) of the electronic mall, to the inter-center communication control unit 15a in the personal computer communication center 10a. The notification contains the above result of the transmission (delivery), the telephone-access number of the facsimile terminal 6, the identification number of the sender-side subscriber, and the like.

STEP 315: When the inter-center communication control unit 15a in the personal computer communication center 10a receives the above notification, the inter-center communication control unit activates the electronic mail service control unit 12a. The electronic mail service control unit 12a converts the identification number in the facsimile mail center 20a into a corresponding identification number in the personal computer communication center 10a, and renews the list of mails transmitted from sender for the subscriber in the electronic mail information control file 17a, based on the above notification.

STEP 316: The subscriber A calls to connect the personal computer 1 with the personal computer communication center 10a, and logs on the system. The subscriber A inputs the identification number and the password in accordance with the log-on service provided by the line control unit 11a. After examining the qualifications of the subscriber A, the line control unit 11a transmits a top menu to the personal computer 1.

STEP 317: The subscriber A selects "record of transmission for electronic mails" from the menu.

STEP 318: The line control unit 11a activates the electronic mail service control unit 12a. The electronic mail service control unit 12a reads the record of transmission for electronic mails from the electronic mail information control file 17a, and transmits the same to the personal computer 1.

STEP 319: The subscriber A confirms the record of transmission for electronic mails.

STEP 320: The subscriber A logs off the system, and disconnects the line to the personal computer communication center 10a.

Thus, according to the present invention, an electronic mail can be delivered through the facsimile mail center by transmitting a command from a personal computer connected to a personal computer communication center.

Figure 9B:
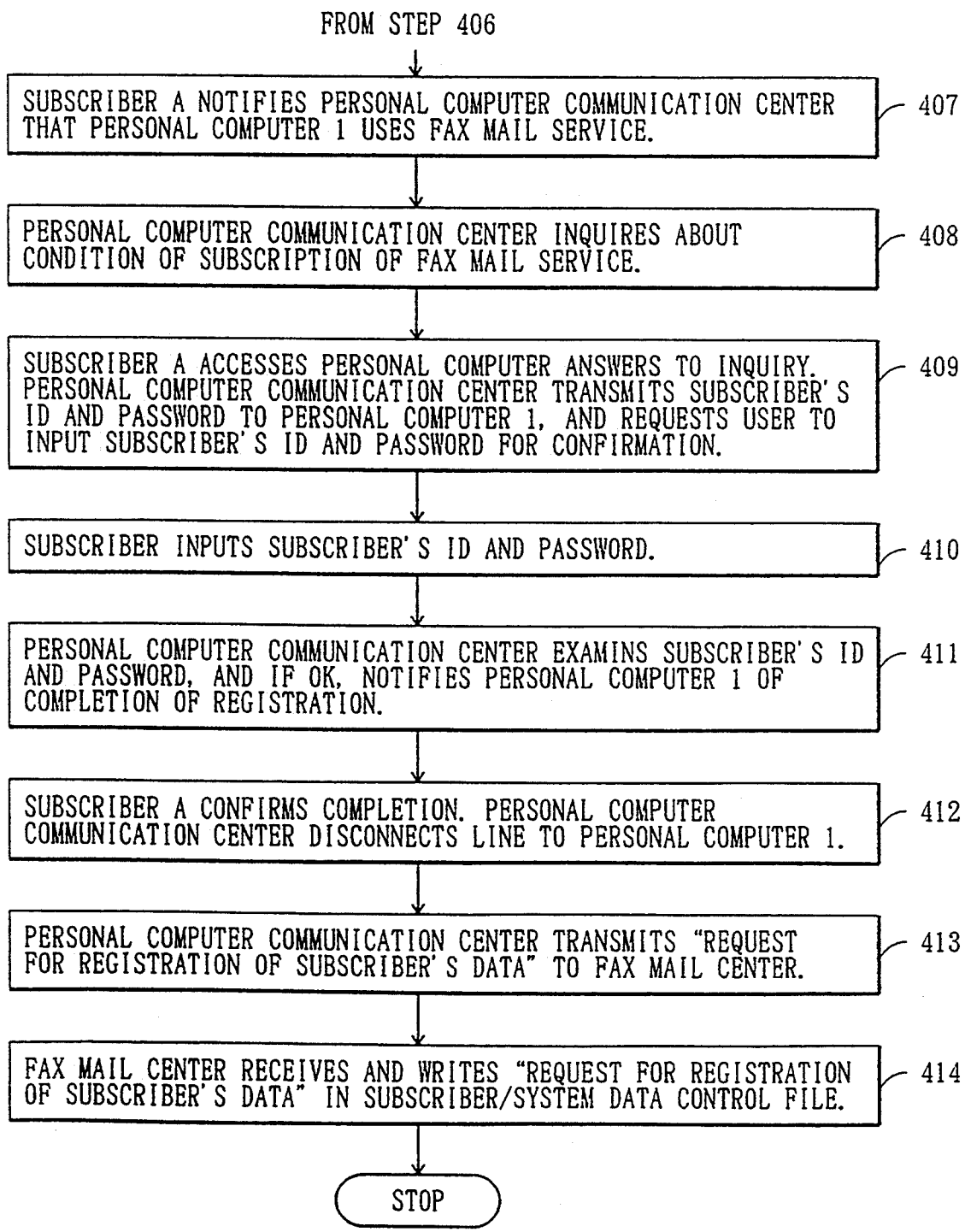

Operations of Registration of Subscriber's data (FIGS. 9A, 9B and 10)

FIGS. 9A and 9B indicate a flowchart registration operations Of subscriber data, and FIG. 10 indicate is a sequence diagram of registration operations of subscriber data.

STEP 401: The user of the personal computer 1 prepares to communicate with the personal computer communication center 10a (connection of hardware, and installation of communication software).

STEP 402: The user of the personal computer 1 connects the personal computer 1 with the personal computer communication center 10a as described before. The user of the personal computer 1 transmits a request for an "on-line sign-up" to the personal computer communication center 10a. The administration and management unit 14a in the personal computer communication center 10a transmits an inquiry for the sign-up, to the personal computer 1. The inquiry contains: an agreement with the rules of the system, a name, an address, a telephone number, an address of an office, the type of credit card, the type of the personal computer 1, the number of lines in the display of the personal computer 1, and the like.

STEP 403: The user of the personal computer 1 inputs registration data for the sign-up in accordance with instructions from the administration and management unit 14a. The administration and management unit 14a transmits an identification number of a subscriber, and a password, to the user of the personal computer 1, and requests an input of the name for confirmation.

STEP 404: The user of the personal computer 1 inputs the identification number and the password transmitted as above.

STEP 405: The administration and management unit 14a examines the above identification number and the password, and writes the registration data received from the personal computer 1, in the subscriber/system data control file 16a, when it is determined that the identification number and the password are acceptable.

STEP 406: The administration and management unit 14a asks the personal computer 1 whether or not the user (subscriber A) of the personal computer 1 wishes to use the facsimile mail service.

STEP 407: The subscriber A notifies the administration and management unit 14a that the subscriber A wishes to use the facsimile mail service.

STEP 408: The administration and management unit 14a transmits an inquiry for conditions of the terminal equipment (for example, whether the facsimile terminal is G3 or G4), the number of re-sending operations, the interval in re-sending, whether a transmission/reception journal exists, class of closed user group, and the like. The subscriber A inputs the above conditions for subscription in response to the above inquiry.

STEP 409: The administration and management unit 14a transmits an identification number and a password to access the facsimile mail center 20a, to the personal computer 1, and requests the personal computer 1 to return the identification number and password to the personal computer communication center 10a.

STEP 410: The subscriber A inputs the identification number and password notified as above, from the personal computer 1.

STEP 411: The administration and management unit 14a examines the received identification number and password. When the identification number and the password are determined to be acceptable, the administration and management unit 14a notifies the personal computer 1 of completion of the operation of the registration.

STEP 412: When the subscriber A confirms the completion of the operation, the line control unit 11a disconnects the line.

STEP 413: The administration and management unit 14a activates the inter-center communication control unit 15a, and requests allowance for transmission of a request for the registration of subscriber's data. The inter-center communication control unit 15a transmits the request for registration of subscriber's data, to the inter-center communication control unit 25a in the facsimile mail center 20a. The above request contains the above conditions for subscription.

STEP 414: When the inter-center communication control unit 25a in the facsimile mail center 20a receives the above request, the inter-center communication control unit 25a activates the administration and management unit 24a. The administration and management unit 24a writes the above subscriber's data in the subscriber/system data control file 26a.

Thus, the registration in the facsimile mail center can be carried out at the same time as the registration in the personal computer communication center.

I claim:

1. A communication center apparatus connected to a plurality of data terminals through a communication network for managing and controlling transmissions of text and binary information, including electronic mails, among said plurality of data terminals, to a facsimile mail center and to at least one of a plurality of facsimile terminals, the apparatus comprising:

electronic mail service control means for controlling transmission of electronic mails, first communication control means for controlling communication operations between said electronic mail service control means and the plurality of data terminals, on the side of the communication center apparatus, and second communication control means for controlling communication operations between said electronic mail service control means and the facsimile mail center through a signal path for connecting the communication center apparatus with the facsimile mail center, on the side of the communication center apparatus.

2. A communication center apparatus according to claim 1, and further comprising:

electronic mail information storage means for storing contents of electronic mails which are to be transmitted to at least one of the plurality of facsimile terminals, and electronic mail control data storing means for storing control data used for controlling the transmission of electronic mails.

3. A communication center apparatus according to claim 2, and further comprising:
   facsimile operating command receiving means for receiving a command for an operation of the facsimile mail center, through said first communication control means, and
   facsimile operation command relay means for transferring said command to the facsimile mail center by said second communication control means through said signal path.

4. A communication center apparatus according to claim 3, wherein said facsimile operating command receiving means receives a command for transmitting a message stored in the facsimile mail center, to one or more of the plurality of facsimile terminals.

5. A communication center apparatus according to claim 4, wherein said facsimile operating command receiving means receives a command for transmitting a message stored in one of mailboxes of the facsimile mail center to one corresponding to a mailbox of said plurality of facsimile terminals.

6. A communication center apparatus according to claim 5, and further comprising:
   first list storing means for storing a first list of messages transmitted thereto from the corresponding facsimile terminal, and
   second list storing means for storing a second list of messages transferred thereto from the facsimile mail center and to be transmitted to one of the plurality of facsimile terminals,
   said first list containing information on whether or not each of the messages of the first list has been transferred to at least one of plurality of pieces of facsimile terminal equipment to which each message is to be transmitted, and said second list containing information on whether or not each of the messages of the second list has been transmitted to said one of said plurality of pieces of facsimile terminal equipment to which each message is to be transmitted,
   means for receiving a request for transmitting information in said first and second lists to one of the plurality of data terminals through said first communication control means, from said one of the plurality of data terminals, and
   means for transmitting said information in said first and second lists to said one of the plurality of data terminals from which said command for requesting transmitting information is received, through said first communication control means, in response to said request.

7. A communication center apparatus according to claim 6, and further comprising:
   facsimile mail control data storing means for storing at least a part of control data stored in the facsimile mail center, including the contents of said first and second lists.

8. A communication center apparatus according to claim 5, and further comprising:
   additional information receiving means for receiving additional information to be attached to a message stored in one of said mailboxes, and
   additional information transmitting means for transmitting said additional information to the facsimile mail center by said second communication control means,
   said facsimile operating command receiving means receiving a command for operations of attaching said additional information to said message and transmitting the message together with the additional information to one of the plurality of facsimile terminals corresponding to a mailbox storing the message.

9. A communication center apparatus according to claim 2, and further comprising:
   facsimile delivery command receiving means for receiving through said first communication control means, a command for delivering, by the facsimile mail center, a message of an electronic mail stored in said electronic mail information storage means, to one or more of the plurality of facsimile terminals, and
   facsimile delivery supporting means for transferring said command and said information in said electronic mail to the facsimile mail center by said second communication control means through said signal path.

10. A communication center apparatus according to claim 2, and further comprising:
    means for assigning a first identification number to each of the plurality of data terminals, and
    means for converting a second identification number received from the facsimile mail center into a corresponding first identification number.

11. A communication center apparatus according to claim 2, and further comprising:
    means for receiving a request for a subscriber from one of the plurality of data terminals,
    first inquiry means for transmitting a first inquiry on a first condition as a subscriber of the communication center apparatus to the data terminal from which said request is received, through said first communication control means,
    means for receiving information on said first condition from the data terminal through said first communication control means in response to said first inquiry,
    first registration means for registering said first condition corresponding to said data terminal,
    second inquiry means for transmitting inquiries on a second condition as a subscriber of the communication center apparatus to the data terminal from which said request is received, through said first communication control means, said second condition including information by which the facsimile mail center can access one of the plurality of facsimile terminals corresponding to said data terminal,
    means for receiving information on said second condition from said data terminal through said first communication control means in response to said second inquiry, and
    subscriber's condition transferring means for transferring said second condition to the facsimile mail center by said second communication control means through said signal path.

12. A facsimile mail center apparatus connected to a plurality of facsimile terminals through a communication network, for managing and controlling transmissions of facsimile mails among said facsimile terminals, to a communication center and to at least one of data terminals, the apparatus comprising:
    facsimile mail service control means for controlling transmission of facsimile mails;
    first communication control means for controlling communication operations between said facsimile mail service control means and the plurality of data terminals, on the side of the facsimile mail center apparatus, and second communication control means for controlling communication operations between said facsimile mail service control means and the communication center through a signal path for connecting the facsimile mail center apparatus with the communication center.

13. A facsimile mail center apparatus according to claim 12, and further comprising:

facsimile mail information storage means for storing contents of facsimile mails which are to be transmitted to at least one of the plurality of facsimile terminals, and facsimile mail control data storing means for storing control data used for controlling the transmission of facsimile mails.

14. A facsimile mail center apparatus according to claim 13, and further comprising:

relayed command executing means for receiving a command transferred through said signal path and said second communication control means, and executing the received command by activating said facsimile mail service control means in response to the received command.

15. A facsimile mail center apparatus according to claim 14, wherein said facsimile mail information storage means comprises:

a mailbox corresponding to each of the plurality of facsimile terminals, said mailbox storing a message transmitted from the corresponding facsimile terminal to the facsimile mail center apparatus, and as message to be transmitted from the facsimile mail center apparatus to the corresponding facsimile terminal, and said facsimile mail service control means comprises means for transferring the message stored in said mailbox corresponding to said one of the plurality of facsimile terminals, to at least one of other mailboxes corresponding to the plurality of facsimile terminals other than said one facsimile terminal, in response to said command for a transferring operation.

16. A facsimile mail center apparatus according to claim 15, wherein said facsimile mail service control means comprises means for transmitting the message stored in said one of said mailboxes to said one corresponding mailbox of said plurality of facsimile terminals, in response to said command for the transmitting operation.

17. A facsimile mail center apparatus according to claim 16, wherein said facsimile mail service control means comprises facsimile control data transmitting means for transmitting said at least a part of said control data stored in said facsimile mail control data storing means to the communication center by said second communication control means through said signal path, when said control data is renewed.

18. A facsimile mail center apparatus according to claim 15, wherein said facsimile mail service control means comprises:

means for receiving a command from the communication center for attaching and transmitting an additional information, through said second communication control means, means for receiving said additional information transmitted from the communication center, through said second communication control means, converting means for converting the received additional information into image data, and transmitting means for transmitting by facsimile said image data of the converted additional information, and a message stored in one of said mailboxes, to one of the plurality of facsimile terminals corresponding to a mailbox storing the message, through said first communication control means, in response to said command for attaching and transmitting.

19. A facsimile mail center apparatus according to claim 15, and further comprising:

means for receiving a condition as a subscriber of the communication center through said second communication control means, and registration means for registering said condition corresponding to a data terminal from which a request on said condition is received.

20. A facsimile mail center apparatus according to claim 13, and further comprising:

converting means for receiving a command and information in the electronic mail transferred from the communication center through said second communication control means, and converting the information in the electronic mail into image data, and facsimile delivery means for delivering, by facsimile, the image data of the converted information in the electronic mail, to at least one of the plurality of facsimile terminals through said first communication control means.

21. A linked mail system comprising:

a plurality of data terminals;

a communication center connected to said plurality of data terminals, respectively, through a communication network, for managing and controlling transmissions of text and binary information, including electronic mails, among said plurality of data terminals and the communication center.

a plurality of facsimile terminals;

a facsimile mail center connected to said plurality of facsimile terminals, respectively, through a communication network, for managing and controlling transmissions of facsimile mails among said plurality of facsimile terminals and said facsimile mail center; and a signal path connecting said communication center and said facsimile mail center; wherein said facsimile mail center comprises facsimile mail service control means for controlling transmission of facsimile mails, first communication control means for controlling communication operations between said facsimile mail service control means and said plurality of data terminals, on the side of said facsimile mail center, and second communication control means for controlling communication operations between said facsimile mail service control means and said communication center through said signal path.

22. A linked mail system according to claim 21, wherein said communication center comprises:

electronic mail service control means for controlling transmission of electronic mails, third communication control means for controlling communication operations between said electronic mail service control means and said plurality of data terminals, on the side of said communication center, and fourth communication control means for controlling communication operations between said electronic mail service control means and said facsimile mail center through said signal path, on the side of said communication center.

23. A linked mail system according to claim 22, wherein said facsimile mail center further comprises:

facsimile mail information storage means for storing contents of facsimile mails which are to be transmitted to at least one of said plurality of facsimile terminals, and facsimile mail control data storing means for storing control data used for controlling the transmission of facsimile mails.

24. A linked mail system according to claim 23, wherein said communication center further comprises:

electronic mail information storage means for storing contents of electronic mails which are to be transmitted to at least one of said plurality of facsimile terminals, and electronic mail control data storing means for storing control data used for controlling the transmission of electronic mails.

25. A linked mail system according to claim 24, wherein said communication center further comprises:

facsimile operating command receiving means for receiving a command for an operation of said facsimile mail center, through said third communication control means, and facsimile operation command relay means for transferring said command to said facsimile mail center by said fourth communication control means and said signal path through said signal path, and said facsimile mail center further comprises:

relayed command executing means for receiving said command transferred through said signal path and said second communication control means, and executing the received command by activating said facsimile mail service control means in response to the received command.

26. A linked mail system according to claim 25, wherein said facsimile operating command receiving means receives a command for transmitting a message stored in said facsimile mail information storage means, to one or more of said plurality of facsimile terminals.

27. A linked mail system according to claim 25, wherein said facsimile mail information storage means comprises a mailbox corresponding to each of said plurality of facsimile terminals, said mailbox storing a message transmitted from the corresponding facsimile terminal to the facsimile mail center, and a message to be transmitted from the facsimile mail center to the corresponding facsimile terminal, said facsimile operating command receiving means receiving a command for transferring a message stored in said mailbox corresponding to one of said plurality of facsimile terminals, to at least one of other mailboxes corresponding to said plurality of facsimile terminals other than said one facsimile terminal, said facsimile mail service control means in said facsimile mail center comprising means for transferring the message stored in said mailbox corresponding to said one of said plurality of facsimile terminals, to said at least one of other mailboxes corresponding to said plurality of facsimile terminals other than said one facsimile terminal, in response to said command for a transferring operation.

28. A linked mail system according to claim 27, wherein said facsimile operating command receiving means receives a command for transmitting a message stored in one of said mailboxes to one corresponding to a mailbox of said plurality of facsimile terminals, and said facsimile mail service control means in said facsimile mail center comprises means for transmitting the message stored in said one of said mailboxes to said one corresponding mailbox of aid plurality of facsimile terminals, in response to said command for the transmitting operation.

29. A linked mail system according to claim 28, wherein said communication center comprises second facsimile mail control data storing means for storing at least a part of said control data stored in said facsimile mail control data storing means in said facsimile mail center, including the contents of said first and second lists, and said facsimile mail service control means in said facsimile mail center comprises facsimile control data transmitting means for transmitting said at least a part of said control data stored in said facsimile mail control data storing means, including the contents of said first and second lists, to said communication center by said second communication control means through said signal path, when said control data is renewed.

30. A linked mail system according to claim 27, wherein said communication center comprises:

first list storing means for storing a first list of messages stored in each mailbox and transmitted thereto from the corresponding facsimile terminal, and second list storing means for storing a second list of messages stored in each mailbox and transferred thereto from one of the other mailboxes to be transmitted to one of plurality of facsimile terminals corresponding to the mailbox, said first list containing information on whether or not each of the messages of the first list has been transferred to at least one of plurality of pieces of facsimile terminal equipment to which each message is to be transmitted, and said second list containing information on whether or not each of the messages of the second list has been transmitted to said one of said plurality of pieces of facsimile terminal equipment to which each message is to be transmitted, means for receiving a request for transmitting information in said first and second lists to one of said plurality of data terminals through said third communication control means, from said one of said plurality of data terminals, and means for transmitting said information in said first and second lists to said one of said plurality of data terminals from which said command for requesting transmitting information is received, through said third communication control means, in response to said request.

31. A linked mail system according to claim 27, wherein said communication center further comprises:

additional information receiving means for receiving additional information to be attached to a message stored in one of said mailboxes, and additional information transmitting means for transmitting said additional information to said facsimile mail center by said fourth communication control means, said facsimile operating command receiving means receiving a command for operations of attaching said additional information to said message and transmitting the message together with the additional information to one of said plurality of facsimile terminals corresponding to said mailbox storing the message; and said facsimile mail service control means in said facsimile mail center comprises:

means for receiving said command for attaching and transmitting, through said second communication control means, means for receiving said additional information transmitted from said additional information transmitting means, through said second communication means, converting means for converting the received additional information into image data, and transmitting means for transmitting by facsimile said image data of the converted additional information, and said message, to one of said plurality of facsimile terminals corresponding to a mailbox storing the message, through said first communication control means, in response to said command for attaching and transmitting.

32. A linked mail system according to claim 24, wherein said communication center further comprises:

facsimile delivery command receiving means for receiving through said third communication control means, a command for delivering, by said facsimile mail center, a message of an electronic mail stored in said electronic mail information storing means, to one or more of said plurality of facsimile terminals, and facsimile delivery supporting means for transferring said command and said information in said electronic mail to said facsimile mail center by said fourth communication control means through said signal path, and said facsimile mail center further comprises:

converting means for receiving said command and said information in the electronic mail transferred from said communication center through said second communication control means, and converting the information in the electronic mail into image data, facsimile delivery means for delivering, by facsimile, the image data of the converted information in the electronic mail, to said one or more of said plurality of facsimile terminals through said first communication control means.

33. A linked mail system according to claim 24, wherein said communication center comprises means for assigning a first identification number to each of said plurality of data terminals, and said facsimile mail center comprises means for assigning a second identification number to each of said plurality of facsimile terminals; and said communication center further comprises means for converting one of the second identification number into a corresponding first identification number, and said facsimile mail center further comprising a unit for converting one of the first identification number into a corresponding second identification number.

34. A linked mail system according to claim 24, wherein said communication center comprises:

means for receiving a request for a subscriber signing-up of said linked mail system from one of said plurality of data terminals, first inquiry means for transmitting a first inquiry on a first condition as a subscriber of said communication center to the data terminal from which said request is received, through said third communication control means, means for receiving information on said first condition from said data terminal through said third communication control means in response to said first inquiry, first registration means for registering said first condition corresponding to said data terminal, second inquiry means for transmitting inquiries on a second condition as a subscriber of said communication center to the data terminal from which said request is received, through said third communication control means, said second condition including information by which said facsimile mail center can access one of said plurality of facsimile terminals corresponding to said data terminal, means for receiving information on said second condition from said data terminal through said third communication control means in response to said second inquiry, and subscriber's condition transferring means for transferring said second condition to said facsimile mail center by said fourth communication control means through said signal path; and said facsimile mail center comprises:

means for receiving said second condition through said second communication control means, and second registration means for registering said second condition corresponding to said data terminal.

35. A linked mail system comprising:

a plurality of data terminals;

a communication center connected to said plurality of data terminals, respectively, through a communication network, for managing and controlling transmissions of text and binary information, including electronic mails, among said plurality of data terminals and the communication center;

a plurality of facsimile terminals;

a facsimile mail center connected to said plurality of facsimile mail terminals, respectively, through a communication network, for managing and controlling transmissions of facsimile mails among said plurality of facsimile terminals and said facsimile mail center; and a signal path connecting said communication center and said facsimile mail center;

said communication center comprising electronic mail service control means for controlling the transmission of electronic mails, third communication control means for controlling communication operations between said electronic mail service control means and said plurality of data terminals, and fourth communication control means for controlling communication operations between said electronic mail service control means and said facsimile mail center through said signal path.

36. A linked mail system according to claim 35, wherein said communication center comprises
electronic mail information storage means for storing contents of electronic mails which are to be transmitted to one or more of said plurality of facsimile terminals, and
electronic mail control data storing means for storing control data used for controlling the transmission of electronic mails.

37. A linked message board system comprising:
a communication system comprising
a plurality of data terminals, and
a communication center connected to said plurality of data terminals, respectively, through a communication network, for managing and controlling transmissions of text and binary information, including electronic message boards, among said plurality of data terminals and the communication center;
a facsimile mail/message board system comprising
a plurality of facsimile terminals, and
a facsimile mail/message board center connected to said plurality of facsimile terminals, respectively, through a communication network, for managing and controlling registration and reading operations of facsimile message boards by said plurality of facsimile terminals; and
a signal path connecting said communication center and said facsimile mail/message board center;
said facsimile mail/message board center comprising
facsimile message board service control means for controlling the transmission of information on the facsimile message boards by the plurality of data terminals,
first communication control means for controlling, on the side of said facsimile mail/message board center, the transmission of information on the facsimile message boards between the plurality of data terminals and said facsimile mail/message board center,
second communication control means for controlling, on the side of said facsimile mail/message board center, communication operations between said facsimile message board service control means and said facsimile mail/message board center through said signal path,
facsimile message board information storage means for storing contents of the facsimile message boards, and
facsimile message board control data storing means for storing control data being used by said service control means for controlling the facsimile message boards; and
said communication center comprising
service control means for controlling the transmission of electronic message boards,
third communication control means for controlling communication operations between service control means and said plurality of data terminals, on the side of said communication center, and
fourth communication control means for controlling communication operations between said service control means and said facsimile mail/message board center through said signal path, on the side of said communication center.

38. A linked message board system according to claim 37, wherein said communication center further comprises
facsimile operating command receiving means for receiving a command for an operation of said facsimile mail/message board center, through said third communication control means, and
facsimile operation command relay means for transferring said command to said facsimile mail/message board center by said fourth communication control means and said signal path through said signal path,
said facsimile mail/message board center comprising relayed command executing means for receiving said command transferred through said signal path and said second communication control means, and executing the received command by activating said facsimile message board service control means in response to the received command.

39. A linked message board system according to claim 38, wherein said facsimile operating command receiving means receives a command for transmitting a message stored in said facsimile message board information storage means, to one or more of said plurality of facsimile terminals.

40. A linked message board system according to claim 38, wherein said facsimile message board information storage means stores information on said message boards,
said facsimile operating command receiving mean receives a command for transmitting a message stored in one of said message boards to one of said plurality of facsimile terminals, and
said facsimile message board service control means in said facsimile mail/message board center comprises means for transmitting the message stored in said one of said plurality of facsimile terminals, in response to said command for a transmitting operation.

41. A linked message board system according to claim 40, wherein said communication center comprises list storing means for storing a list of messages stored in each message board;
said communication center further comprises
means for receiving a request for transmitting information in said list to one of said plurality of data terminals through said third communication control means, from said one of said plurality of data terminals, and
means for transmitting said information in said list to said one of said plurality of data terminals from which said command for requesting transmitting information is received, through said third communication control means, in response to said request.

42. A linked message board system according to claim 41, wherein said communication center comprises second facsimile message board control data storing means for storing at least a part of said control data stored in said facsimile message board control data storing means in said facsimile mail/message board center including contents of said list, and
said facsimile message board service control means in said facsimile mail/message board center comprises facsimile control data transmitting means for transmitting said at least a part of said control data stored in said facsimile message board control data storing means, including the contents of said list, to said communication center by said second communication control means through said signal path, when said control data is renewed.

* * * * *

UNITED STATES PATENT AND TRADEMARK OFFICE
CERTIFICATE OF CORRECTION

PATENT NO.  : 5,339,156

DATED       : August 16, 1994

INVENTOR(S) : TOSHIO ISHII

It is certified that error appears in the above-identified patent and that said Letters Patent is hereby corrected as shown below:

In column 2, line 26, please delete the word "data" and insert --facsimile-- in its place.

In column 5, line 64, please delete the word "data" and insert --facsimile-- in its place.

In column 5, line 68, please delete the word "data" and insert --facsimile-- in its place.

In column 6, line 10, after the word "the" and before the word "service" insert --electronic message board--.

In column 25, line 1, please delete the word "data" and insert --facsimile-- in its place.

In column 26, line 58, please delete the word "data" and insert --facsimile-- in its place.

In column 31, line 35, please delete the word "data" and insert --facsimile-- in its place.

In column 31, line 40, please delete the word "data" and insert --facsimile-- in its place.

UNITED STATES PATENT AND TRADEMARK OFFICE
CERTIFICATE OF CORRECTION

PATENT NO. : 5,339,156

DATED : August 16, 1994

INVENTOR(S) : TOSHIO ISHII

It is certified that error appears in the above-indentified patent and that said Letters Patent is hereby corrected as shown below:

In column 31, line 53, before the word "service" please insert --facsimile message board--.

Signed and Sealed this

Thirtieth Day of April, 1996

Attest:

BRUCE LEHMAN

*Attesting Officer*     *Commissioner of Patents and Trademarks*